(12) United States Patent
Xu et al.

(10) Patent No.: US 12,267,560 B2
(45) Date of Patent: Apr. 1, 2025

(54) VIDEO PLAYBACK METHOD, TERMINAL DEVICE, APPARATUS, SYSTEM, AND STORAGE MEDIUM

(71) Applicant: Petal Cloud Technology Co., Ltd., Guangdong (CN)

(72) Inventors: Wei Xu, Nanjing (CN); Lei Jiang, Nanjing (CN)

(73) Assignee: PETAL CLOUD TECHNOLOGY CO., LTD., Dongguan (CN)

( * ) Notice: Subject to any disclaimer, the term of this patent is extended or adjusted under 35 U.S.C. 154(b) by 21 days.

(21) Appl. No.: 18/468,307

(22) Filed: Sep. 15, 2023

(65) Prior Publication Data

US 2024/0031655 A1    Jan. 25, 2024

Related U.S. Application Data

(63) Continuation of application No. PCT/CN2022/080618, filed on Mar. 14, 2022.

(30) Foreign Application Priority Data

Mar. 16, 2021  (CN) .......................... 202110281163.1

(51) Int. Cl.
*H04N 21/472* (2011.01)
*G06V 10/44* (2022.01)
*G06V 10/762* (2022.01)
*H04N 21/845* (2011.01)

(52) U.S. Cl.
CPC ....... *H04N 21/47217* (2013.01); *G06V 10/44* (2022.01); *G06V 10/762* (2022.01); *H04N 21/8456* (2013.01)

(58) Field of Classification Search
None
See application file for complete search history.

(56) References Cited

U.S. PATENT DOCUMENTS

| | | | |
|---|---|---|---|
| 9,544,650 B1* | 1/2017 | Oztaskent | H04N 21/8358 |
| 2009/0006368 A1* | 1/2009 | Mei | H04N 21/4667 |
| | | | 707/999.005 |
| 2011/0113438 A1* | 5/2011 | Patil | H04N 21/4784 |
| | | | 725/40 |
| 2015/0143404 A1* | 5/2015 | Byers | G06Q 30/0207 |
| | | | 725/32 |

(Continued)

FOREIGN PATENT DOCUMENTS

| | | |
|---|---|---|
| CN | 105677735 A | 6/2016 |
| CN | 109309860 A | 2/2019 |

(Continued)

*Primary Examiner* — Alexander Q Huerta
(74) *Attorney, Agent, or Firm* — Conley Rose, P.C.

(57) ABSTRACT

A video playback method includes detecting a playback location of a first video, and prompting, when a start location of a first video clip in the first video is played, a user whether to watch a second video clip having a same plot as the first video clip at the same time; sending a same plot clip request of the first video clip to a video cloud platform in response to a confirmation operation of the user; receiving, from the video cloud platform, a video corresponding to the second video clip, a start location and an end location of the second video clip; and playing a part or all of the second video clip and the first video clip on a same interface.

20 Claims, 15 Drawing Sheets

(56) References Cited

U.S. PATENT DOCUMENTS

| | | | | |
|---|---|---|---|---|
| 2017/0238056 A1* | 8/2017 | Greene | ............... | G06F 16/7837 |
| | | | | 725/131 |
| 2017/0251259 A1* | 8/2017 | Klappert | ............ | H04N 21/4826 |
| 2019/0206444 A1* | 7/2019 | Bates | ................... | H04N 21/435 |
| 2019/0349641 A1 | 11/2019 | Choi et al. | | |
| 2021/0360321 A1* | 11/2021 | Menendez | ................ | G06T 7/40 |
| 2022/0182728 A1* | 6/2022 | Patel | .................. | H04N 21/4668 |
| 2023/0291963 A1* | 9/2023 | Gupta | ............. | H04N 21/44226 |

FOREIGN PATENT DOCUMENTS

| | | |
|---|---|---|
| CN | 110149558 A | 8/2019 |
| CN | 111143610 A | 5/2020 |
| CN | 111611436 A | 9/2020 |
| JP | 2010278512 A | 12/2010 |

* cited by examiner

VIDEO PLAYBACK METHOD, TERMINAL DEVICE, APPARATUS, SYSTEM, AND STORAGE MEDIUM

CROSS-REFERENCE TO RELATED APPLICATIONS

This is a continuation of International Patent Application No. PCT/CN2022/080618 filed on Mar. 14, 2022, which claims priority to Chinese Patent Application No. 202110281163.1 filed on Mar. 16, 2021. The disclosures of the aforementioned applications are hereby incorporated by reference in their entireties.

TECHNICAL FIELD

This disclosure relates to the field of terminal technologies, and in particular, to a video playback method, a terminal device, an apparatus, a system, and a storage medium.

BACKGROUND

With the development of a network and the popularization of an intelligent terminal device, a quantity of various videos on the network increases explosively. To adapt to a watching habit of a user, some video playback software actively analyzes a historical watching record of the user and recommends a video of a same type or a similar plot to the user.

However, an interest point of the user is usually transient. Recommending a related video after the historical watching record is analyzed cannot catch an association psychology of the user in a video watching process in time. For example, when the user is watching Demi-Gods and Semi-Devils of the 03 version, when the user watches a clip "Qiao Feng Three Brothers Battle Shaolin Temple", it occurs to the user that Demi-Gods and Semi-Devils of the 97 version has a same plot. The video playback software analyzes this watching record after the user completes watching the current video. The user may lose an interest when Demi-Gods and Semi-Devils of the 97 version is recommended to the user. How to catch the association psychology of the user in a video watching process and recommend related content in time becomes an urgent problem to be resolved.

SUMMARY

Embodiments of this disclosure provide a video playback method, a terminal device, an apparatus, a system, and a storage medium, to recommend another video clip having a same plot to a user at a video clip in a currently played video, actively cater to an association psychology of the user for the same plot clip, quickly implement split-screen and simultaneous-display playback of a plurality of video clips having the same plot, and improve user experience.

According to a first aspect, this disclosure provides a video playback method, applied to a terminal device including a display, and the method includes detecting a playback location of a first video, and prompting, when a start location of a first video clip in the first video is played, a user whether to watch another video clip having a same plot as the first video clip at the same time, sending a same plot clip request of the first video clip to a video cloud platform in response to a confirmation operation of the user, receiving, from the video cloud platform, a video corresponding to the other video clip, and a start location and an end location of the other video clip, and playing a part or all of the other video clip and the first video clip on a same interface.

It should be noted that the first video has at least one related version video, and the related version video of the first video includes the other video clip having the same plot as the first video clip. In other words, the related version video of the first video is a video corresponding to the other video clip. Certainly, in addition to the first video clip, the first video may further include a second video clip, and in a related version video, there may also be another video clip having the same plot as the second video clip. The start location and the end location may be both summarized as a start time and a stop time of a video clip in a corresponding video.

It can be learned that, by detecting the playback location of the first video, and prompting, when the first video clip in the first video is played the user whether to watch the other video clip having the same plot as the first video clip at the same time, this caters to an association psychology of the user at the first video clip. Then, by sending a request to the video cloud platform, and playing an obtained another video clip and the first video clip on the same interface, this provides intuitive comparison of the same plot clip and improves user experience.

Based on the first aspect, in a possible embodiment, after the part or all of the other video clip and the first video clip on the same interface is played, the method further includes prompting, when playing of the first video clip and/or the other video clip is completed, the user whether to continue to watch the first video and/or the video corresponding to the other video clip, and continuing to play, when the user chooses to continue to watch the first video and the video corresponding to the other video clip, the first video and the video corresponding to the other video clip, or closing, when the user chooses to watch the first video, the video corresponding to the other video clip, or closing, when the user chooses to watch the video corresponding to the other video clip, the first video.

It can be learned that, the user is prompted, after playing of the first video clip and/or the other video clip is completed, whether to continue to watch the first video and/or the video corresponding to the other video clip, and then the corresponding video is played based on a chosen of the user. This can improve user experience.

Based on the first aspect, in a possible embodiment, before the playback location of the first video is detected, the method further includes sending a watching request of the first video to the video cloud platform, receiving the first video, and the start location and an end location of the first video clip from the video cloud platform, and playing the first video.

It can be learned that, before the playback location of the first video is detected, the terminal device requests the first video from the video cloud platform, and then receives the first video, and the start location and the end location of the first video clip from the video cloud platform, to detect the playback location of the first video in a playback process of the first video. This further prompts the user at the first video clip whether to obtain the other video clip having the same plot as the first video clip, actively caters to the association psychology of the user having the same plot clip, and improves user experience.

According to a second aspect, an embodiment of this disclosure provides another video playback method, applied to a video cloud platform. The method includes receiving a same plot clip request of a first video clip from a terminal device, where the first video clip is located in a first video, and sending, to the terminal device, a video corresponding to another video clip having a same plot as the first video clip, and a start location and an end location of the other video clip, to enable the terminal device to play a part or all of the other video clip and the first video clip on a same interface.

It can be learned that, by receiving a request from the terminal device, and then sending, to the terminal device, the video corresponding to another video clip having the same plot as the first video clip, and the start location and the end location of the other video clip, the terminal device can implement split-screen and simultaneous-display playback of a plurality of video clips having the same plot. This caters to an association psychology of a user for the same plot clip in a current video watching process, provides intuitive video clip comparison, and improves user experience.

Based on the second aspect, in a possible embodiment, before the same plot clip request of the first video clip from the terminal device is received, the method further includes receiving a watching request of the first video from the terminal device, and sending the first video, and the start location and the end location of the first video clip to the terminal device.

It can be learned that, after receiving the watching request of the first video from the terminal device, the video cloud platform sends the first video, and the start location and the end location of the first video clip to the terminal device, so that the terminal device can detect a playback location of the first video, and prompts, when the first video clip in the first video is played, the user whether to watch the other video clip having the same plot as the first video clip. This caters to the association psychology of the user and improves user experience.

Based on the second aspect, in a possible embodiment, before the same plot clip request of the first video clip from the terminal device is received, the method further includes obtaining a plurality of video clips having the same plot from a plurality of videos, and separately recording a start location and an end location of each video clip in the plurality of video clips having the same plot. The first video is any video in the plurality of videos, and the plurality of video clips having the same plot include the first video clip and the other video clip.

It can be learned that, by obtaining the plurality of video clips having the same plot from the plurality of videos, and separately recording the start location and the end location of each video clip in the plurality of video clips having the same plot, this can associate the plurality of video clips having the same plot in advance. Then, after receiving a request from the user, the video cloud platform may send the other video clip having the same plot to the terminal device, so that the terminal device quickly implements split-screen and simultaneous-display playback of a plurality of video clips having the same plot, caters to the association psychology of the user for the same plot clip, and improves user experience.

Based on the second aspect, in a possible embodiment, that obtaining a plurality of video clips having the same plot from a plurality of videos includes obtaining a plurality of target type clips from the plurality of videos, and obtaining the plurality of video clips having the same plot from the plurality of target type clips. It should be noted that the target type clip is a video clip that meets a specific condition, and the condition may be set based on an actual requirement. This is not limited in this embodiment of this disclosure. First, the plurality of target type clips is obtained from the plurality of videos, and then the plurality of video clips having the same plot are obtained from the plurality of target type clips, so that the quantity of video clips for determining the plot can be reduced.

Based on the second aspect, in a possible embodiment, that obtaining a plurality of target type clips from the plurality of videos includes separately performing shot splitting on each video in the plurality of videos, to obtain a shot set corresponding to each video, separately performing shot clustering on the shot set of each video by using a cluster algorithm, to obtain a video clip set corresponding to each video, and separately inputting each video clip in the video clip set into a target type detection model, to obtain the plurality of target type clips.

It can be learned that, by separately performing shot splitting and shot clustering on each video in the plurality of videos, and inputting video clips into the target type detection model, this can implement the obtaining the plurality of target type clips in the plurality of videos. The target type detection model is used to determine whether a video clip meets a specific condition and whether the video clip belongs to the target type clip.

Based on the second aspect, in a possible embodiment, that obtaining the plurality of video clips having the same plot from the plurality of target type clips includes extracting audio, an image, and a subtitle document from a current target type clip, where the current target type clip is any target type clip in the plurality of target type clips, respectively inputting the audio, the image, and the subtitle document of the current target type clip into an audio feature extraction model, an image feature extraction model, and a document feature extraction model, to obtain a first audio feature vector, a first image feature vector, and a first document feature vector of the current target type clip, respectively inputting the first audio feature vector, the first image feature vector, and the first document feature vector of the current target type clip into an audio feature refinement model, an image feature refinement model, and a document feature refinement model, to obtain a second audio feature vector, a second image feature vector, and a second document feature vector of the current target type clip, performing vector splicing on the second audio feature vector, the second image feature vector, and the second document feature vector of the current target type clip, to obtain a fused feature vector of the current target type clip, inputting the fused feature vector of the current target type clip into a classification model, to obtain a first label of the current target type clip, extracting a keyword of the current target type clip, and combining the keyword and the first label, to obtain a second label of the current target type clip, and using the target type clip having the same second label as the plurality of video clips having the same plot.

It can be learned that the audio, the image, and the subtitle document are first extracted from the current target type clip, and then are respectively input into a corresponding feature extraction model, to obtain the first audio feature vector, the first image feature vector, and the first document feature vector of the current target type clip. Then the three feature vectors are respectively input into a corresponding feature refinement model, to obtain the second audio feature vector, the second image feature vector, and the second document feature vector of the current target type clip, and the three obtained feature vectors are performed vector splicing, to obtain the fused feature vector of the current target type clip. The fused feature vector is input of the current target type clip into the classification model, to obtain the first label of the current target type clip. Then, the keyword of the current target type clip is extracted, and the keyword and the first label are combined, to obtain the second label of the current target type clip. Finally, the plurality of target type clip having the same second label is used as the plurality of video clips having the same plot. In the method, a feature vector is extracted and corresponding processing is performed to obtain a second label of each target type clip, and then the plurality of video clips having the same plot are identified based on the second label, and the video clips are associated, so that the terminal device can prompt the user in a current video playback process whether to obtain the other video clip having the same plot. This caters to the association psychology of the user, implements split-screen and simultaneous-display playback of the plurality of video clips having the same plot, and improves user experience.

Based on the second aspect, in a possible embodiment, the audio feature extraction model is a VGGish network model, the image feature extraction model is an Inception-V3 network model, the classification model is a mixture of experts model, the audio feature refinement model is a first NetVLAD model, the image feature refinement model is a second NetVLAD model, and the document feature refinement model is a third NetVLAD model. Model parameters of the first NetVLAD model, the second NetVLAD model, and the third NetVLAD model are different.

According to a third aspect, an embodiment of this disclosure provides a terminal device, and the terminal device includes a prompting module configured to detect a playback location of a first video, and prompt, when a start location of a first video clip in the first video is played, a user whether to watch another video clip having a same plot as the first video clip at the same time, a sending module configured to send a same plot clip request of the first video clip to a video cloud platform, a receiving module configured to receive, from the video cloud platform, a video corresponding to the other video clip, and a start location and an end location of the other video clip, and a display module configured to play a part or all of the other video clip and the first video clip on a same interface.

The modules of the terminal device are further configured to implement the method according to any embodiment of the first aspect.

According to a fourth aspect, an embodiment of this disclosure provides an apparatus, and the apparatus includes a receiving module configured to receive a same plot clip request of a first video clip from a terminal device, where the first video clip is located in a first video, and a sending module configured to send, to the terminal device, a video corresponding to another video clip having a same plot as the first video clip, and a start location and an end location of the other video clip, to enable the terminal device to play a part or all of the other video clip and the first video clip on a same interface.

The modules of the foregoing apparatus are further configured to implement the method according to any embodiment of the second aspect.

According to a fifth aspect, an embodiment of this disclosure provides another apparatus. The apparatus includes a processor, a memory, and a transceiver. The processor, the memory, and the transceiver may be connected to each other by using a bus, or may be integrated. The processor is configured to read program code stored in the memory, to perform the method according to any embodiment of the first aspect or the second aspect.

According to a sixth aspect, an embodiment of this disclosure provides another video playback system. The system includes the foregoing terminal device and/or the apparatus.

According to a seventh aspect, an embodiment of the present disclosure provides a computer-readable storage medium. The computer-readable storage medium is configured to store implementation code of any method according to the first aspect or the second aspect.

It may be understood that any one of the foregoing aspects may be implemented together with any other aspect or aspects, or may be independently implemented.

In this embodiment of this disclosure, a video cloud platform pre-obtains a plurality of video clips having a same plot from a plurality of videos, separately records a start location and an end location of each video clip in the plurality of video clips having the same plot, and associates the plurality of video clips having the same plot. When a terminal device requests a first video from the video cloud platform, the video cloud platform not only sends the first video to the terminal device, but also sends the start location and the end location of the first video clip in the first video to the terminal device, so that the terminal device can detect a playback location of the first video. The terminal device prompts, when the start location of the first video clip is played, the user whether to watch another video clip having the same plot as the first video clip. This caters to an association psychology of a user for a same plot clip. After receiving a request from the terminal device, the video cloud platform sends, to the terminal device, a video corresponding to the other video clip having the same plot as the first video clip, and a start location and an end location of the other video clip, so that the terminal device can quickly implement split-screen and simultaneous-display playback of the plurality of video clips having the same plot, and provide intuitive comparison. In addition, the terminal device prompts, when playing of the first video clip and/or the other video clip is completed, the user whether to continue to watch a video corresponding to the first video and/or the other video clip, and then continues to play, based on a chosen of the user, the corresponding video. This improves user experience.

BRIEF DESCRIPTION OF DRAWINGS

To describe the technical solutions in some embodiments of this disclosure more clearly, the following briefly describes the accompanying drawings for describing embodiments.

DESCRIPTION OF EMBODIMENTS

Figure 1:
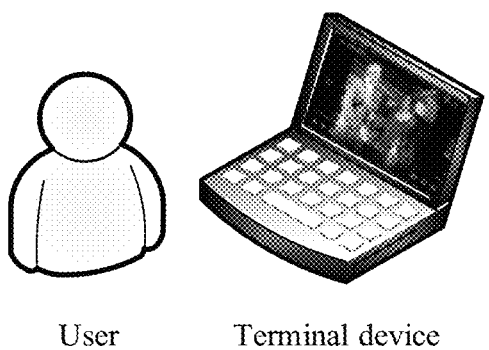
FIG. 1 is a schematic diagram of a video watching scenario according to an embodiment of this disclosure.

The following describes application scenarios related to embodiments of this disclosure. As shown in FIG. 1, a user is watching a video by using a terminal device. When watching a video clip in a current video, the user associates another video clip having a same plot in a related version video. For example, the current video is Demi-Gods and Semi-Devils of the 03 version which is starred by Hu Jun. When the user watches a video clip of the plot "Qiao Feng Three Brothers Battle Shaolin Temple", it occurs to the user that the other video clip in the related version video has the same plot. The related version video may be Demi-Gods and Semi-Devils of the 97 version which is starred by Chen Haomin, or may be Demi-Gods and Semi-Devils of the 13 version which is starred by Zhong Hanliang, these related versions video each include a video clip of the plot "Qiao Feng Three Brothers Battle Shaolin Temple". If the current video is Once Upon a Time in Lingjian Mountain of the TV series version, when the user watches a video clip "Avoid Meteor Impact", it may occur to the user that Once Upon a Time in Lingjian Mountain of the animation version has the same plot. If the current video is Chinese Paladin 3 of the TV series version, when the user watches a video clip of "Jing Tian Battle Chong Lou the Demon", it may occur to the user that Chinese Paladin 3 of the game version has the same plot.

The current video and another related version video are related version videos of each other. The related version videos are a plurality of different movie and video versions adapted from a same story (including a same novel, game, cartoon, or the like). For example, different versions videos such as a television (TV) series version, a movie version, an animation version, a game version video or the like are adapted from the same novel. A plurality of related version videos usually has a same drama name, and certainly, corresponding drama names, titles, and the like may also be different. The plurality of related version videos usually includes some video clips having the same plot, and the video clips easily cause an association psychology of the user.

When it occurs to the user that the other video clip in the related version videos has the same plot, the user wants to search for and watch the video clip. However, when the user actively searches for the related version videos, the user needs to pause watching the current video. This affects watching experience. In a common search manner, a search keyword of the user may not be accurate. For example, if a drama name of the current video is searched, only a related version video whose name is the same as the drama name of the current video can be found, and a related version video whose name is different from the drama name cannot be found, and a start time and a stop time of the video clip having the same plot in the related version video cannot be accurately located. In addition, the video clip having the same plot in the current video clip and the other related version video cannot be directly played at the same time, and the association psychology of the user in a watching process cannot be caught in time and the visual comparison between the same plot clips cannot be provided.

Figure 2:
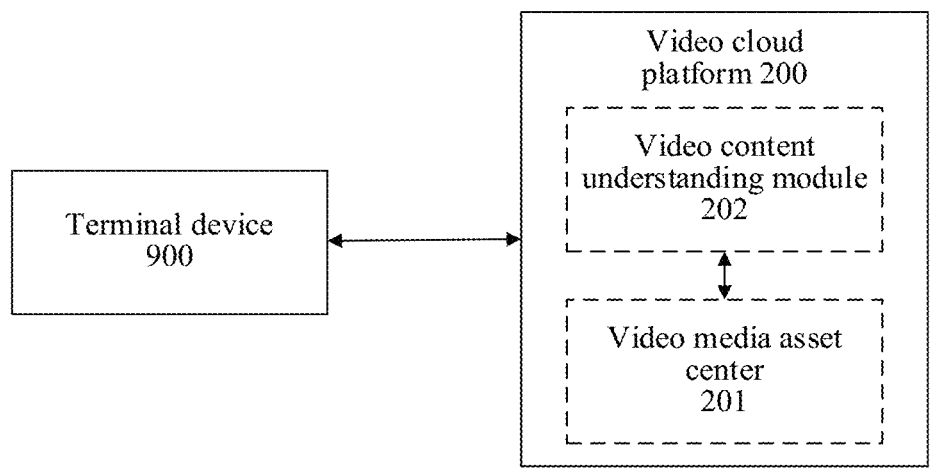
FIG. 2 is a diagram of an architecture of a video playback system according to an embodiment of this disclosure.

FIG. 2 is a diagram of an architecture of a video playback system in a solution according to an embodiment of this disclosure. The video playback system includes a terminal device 900 and a video cloud platform 200.

The terminal device 900 is configured to detect a playback location of a first video, and prompt, when a start location of a first video clip in the first video is played, a user whether to watch another video clip having a same plot as the first video clip at the same time, and send a same plot clip request of the first video clip to a video cloud platform 200 in response to a confirmation operation of the user.

The video cloud platform 200 is configured to receive a same plot clip request of a first video clip from the terminal device 900, and send, to the terminal device 900, a video corresponding to another video clip having a same plot as the first video clip, and a start location and an end location of the other video clip, to enable the terminal device 900 to play a part or all of the other video clip and the first video clip on a same interface.

It should be noted that the first video has at least one related version video, the first video and the video corresponding to the other video clip are related version videos of each other, and the related version video of the first video includes the other video clip having the same plot as the first video clip. The terminal device 900 and the video cloud platform 200 may be connected by using a network. The network may be a wired network, or may be a wireless network, or may be a combination of the two.

The video cloud platform 200 may have a plurality of types of division. FIG. 2 shows an example of division. The video cloud platform 200 includes a video media asset center 201 and a video content understanding module 202. The video content understanding module 202 is configured to analyze video content to obtain corresponding video information. The video media asset center 201 is configured to store a video resource and the video information, and send corresponding content based on a requirement of the terminal device 900. It should be understood that various methods and functions implemented by the video cloud platform 200 may be separately implemented by the video media asset center 201 and the video content understanding module 202. The video cloud platform 200 may be deployed on a physical server, for example, an X86 server, an Arm server, or the like, or may be deployed on a virtual machine (VM) implemented by using a general-purpose physical server and a network functions virtualization (NFV) technology. The virtual machine refers to a complete computer system that is simulated by using software, that has a complete hardware system function and that runs in a completely isolated environment, for example, a virtual machine in a cloud data center. This is not limited in this disclosure. It should be understood that the video cloud platform 200 may be deployed on a single physical server or a single virtual machine, or may be deployed on a computer cluster. The video media asset center 201 and the video content understanding module 202 may be deployed on a same server or a server cluster, or may be deployed on different servers. The two may be connected by using the network. The network may be the wired network, or may be the wireless network, or may be the combination of the two. This is not limited in this disclosure.

Figure 3:
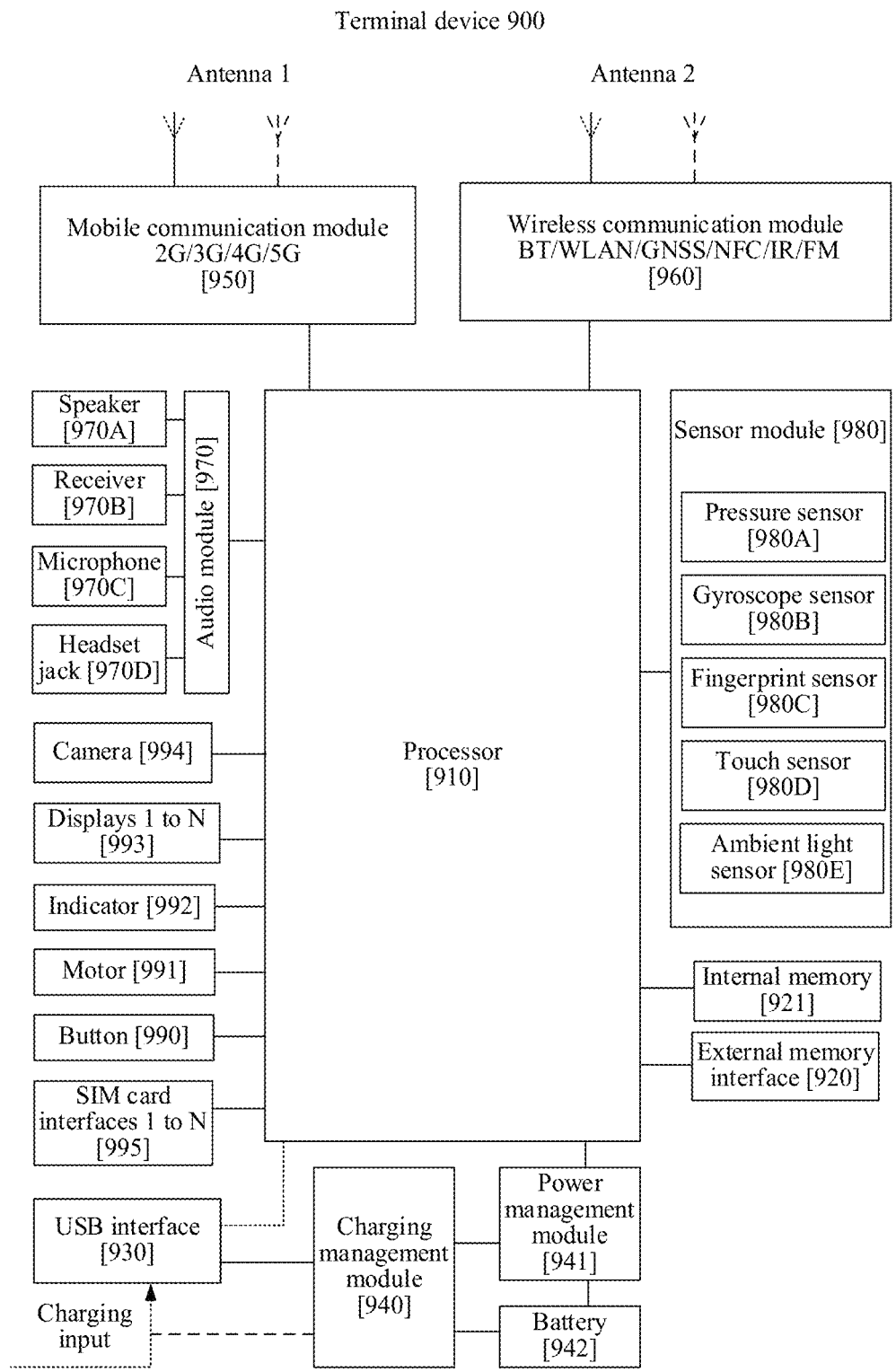
FIG. 3 is a schematic diagram of a structure of a terminal device according to an embodiment of this disclosure.

FIG. 3 is a schematic diagram of a structure of a terminal device 900 according to an embodiment of this disclosure. The terminal device 900 may be a mobile phone, a tablet computer, a wearable device, an in-vehicle device, a notebook computer, a smart television, or the like. A specific type of the terminal device 900 is not limited in this disclosure.

The terminal device 900 may include a processor 910, an external memory interface 920, an internal memory 921, a Universal Serial Bus (USB) interface 930, a charging management module 940, a power management module 941, a battery 942, an antenna 1, an antenna 2, a mobile communication module 950, a wireless communication module 960, an audio module 970, a sensor module 980, a button 990, a motor 991, an indicator 992, a display 993, a camera 994, a user identity module (or subscriber identity module (SIM)) card interface 995, and the like. The audio module 970 may include a speaker 970A, a receiver 970B, a microphone 970C, and a headset jack 970D. The sensor module 980 may include a pressure sensor 980A, a gyroscope sensor 980B, a fingerprint sensor 980C, a touch sensor 980D, an ambient light sensor 980E, and the like.

It can be understood that the structure illustrated in this embodiment of this disclosure does not impose a specific limitation on the terminal device 900. In some other embodiments of this disclosure, the terminal device 900 may include more or fewer components than those shown in the figure, or combine some components, or split some components, or have different component arrangements. The components shown in the figure may be implemented by hardware, software, or a combination of software and hardware.

The processor 910 may include one or more processing units. For example, the processor 910 may include an application processor (AP), a modem processor, a graphics processing unit (GPU), an image signal processor (ISP), a controller, a memory, a video codec, a digital signal processor (DSP), a baseband processor, a neural-network processing unit (NPU), and/or the like. Different processing units may be independent components, or may be integrated into one or more processors.

The controller may be a nerve center and a command center of the terminal device 900. The controller may generate an operation control signal based on instruction operation code and a time sequence signal, to complete control of instruction reading and instruction execution.

A memory may be further disposed in the processor 910, and is configured to store instructions and data. In some embodiments, the memory in the processor 910 is a high-speed buffer storage. The memory may store instructions or data that has been used or cyclically used by the processor 910. If the processor 910 needs to use the instructions or the data again, the instructions or the data may be directly invoked from the memory. This avoids repeated access, reduces waiting time of the processor 910, and improves system efficiency.

In some embodiments, the processor 910 may include one or more interfaces. The interface may include an Inter-Integrated Circuit (I2C) interface, an I2C Sound (I2S) interface, a pulse code modulation (PCM) interface, a universal asynchronous receiver/transmitter (UART) interface, a mobile industry processor interface (MIPI), a general-purpose input/output (GPIO) interface, a SIM interface, a USB interface, and/or the like.

It can be understood that an interface connection relationship between the modules illustrated in this embodiment of this disclosure is merely an example for description, and does not constitute a limitation on the structure of the terminal device 900. In some other embodiments of this disclosure, alternatively, the terminal device 900 may use an interface connection manner different from that in the foregoing embodiment, or use a combination of a plurality of interface connection manners.

The charging management module 940 is configured to receive a charging input from a charger. The charger may be a wireless charger or a wired charger.

The power management module 941 is configured to connect to the battery 942, the charging management module 940, and the processor 910. The power management module 941 receives input of the battery 942 and/or the charging management module 940, and supplies power to the processor 910, the external memory interface 920, the internal memory 921, the display 993, the mobile communication module 950, the wireless communication module 960, and the like.

A wireless communication function of the terminal device 900 may be implemented by using the antenna 1, the antenna 2, the mobile communication module 950, the wireless communication module 960, the modem processor, the baseband processor, and the like.

The terminal device 900 implements a display function by using the GPU, the display 993, the application processor, and the like. The GPU is a microprocessor for graphics processing, and is connected to the display 993 and the application processor. The GPU is configured to perform mathematical and geometric computation, and render an image. The processor 910 may include one or more GPUs, which execute program instructions to generate or change display information.

The display 993 is configured to display an image, a video, and the like. The display 993 includes a display panel. The display panel may be a liquid-crystal display (LCD), an organic light-emitting diode (LED) (OLED), an active-matrix OLED (AMOLED), a flexible LED (FLED), a mini-LED, a micro-LED, a micro-OLED, a quantum dot LED (QLED), or the like. In some embodiments, the terminal device 900 can include one or N displays 993. N is a positive integer greater than 1.

The terminal device 900 may implement a shooting function by using the ISP, the camera 994, the video codec, the GPU, the display 993, the application processor, and the like. The ISP is configured to process data fed back by the camera 994.

The camera 994 is configured to capture a static image or a video. An optical image of an object is generated through the shots, and is projected onto the photosensitive element. The photosensitive element may be a charge-coupled device (CCD) or a complementary metal-oxide-semiconductor (CMOS) phototransistor. The light-sensitive element converts an optical signal into an electrical signal, and then transmits the electrical signal to the ISP to convert the electrical signal into a digital image signal. The ISP outputs the digital image signal to the DSP for processing. The DSP converts the digital image signal into an image signal in a standard format such as red, green, and blue (RGB) or luma, blue projection, and red projection (YUV).

The digital signal processor is configured to process a digital signal, and may process another digital signal in addition to the digital image signal.

The video codec is configured to compress or decompress a digital video. The terminal device 900 may support one or more types of video codecs. In this way, the terminal device 900 may play or record videos in a plurality of coding formats, for example, Moving Picture Experts Group (MPEG)-1, MPEG-2, MPEG-3, and MPEG-4.

The NPU is a neural-network (NN) computing processor, quickly processes input information by referring to a structure of a biological neural network, for example, by referring to a mode of transmission between human brain neurons, and may further continuously perform self-learning. Applications such as intelligent cognition of the terminal device 900, for example, image recognition, facial recognition, speech recognition, document understanding, and the like, can be implemented by using the NPU.

The external memory interface 920 may be configured to connect to an external memory card, for example, a micro SD card, to extend a storage capability of the terminal device 900. The external memory card communicates with the processor 910 through the external memory interface 920, to implement a data storage function. For example, files such as music and videos are stored in the external storage card.

The internal memory 921 may be configured to store computer-executable program code. The executable program code includes instructions. The processor 910 runs the instructions stored in the internal memory 921, to perform various function applications and data processing of the terminal device 900. The internal memory 921 may include a program storage region and a data storage region. The program storage region may store an operating system and an application needed by at least one function (for example, a fingerprint recognition function, and the like). The data storage region may store data created during use of the terminal device 900. In addition, the internal memory 921 may include a high-speed random-access memory (RAM), or may include a nonvolatile memory, for example, at least one magnetic disk storage device, a flash memory, a Universal Flash Storage (UFS), or the like.

The terminal device 900 may implement an audio function by using the audio module 970, the speaker 970A, the receiver 970B, the microphone 970C, the headset jack 970D, the application processor, and the like, for example, audio playing, recording, and the like.

The audio module 970 is configured to convert digital audio information into an analog audio signal output, and is also configured to convert an analog audio input into a digital audio signal.

The speaker 970A, also referred to as a "loudspeaker", is configured to convert an audio electrical signal into a sound signal.

The receiver 970B, also referred to as an "earpiece", is configured to convert an audio electrical signal into a sound signal.

The microphone 970C, also referred to as a "mike" or a "mic", is configured to convert a sound signal into an electrical signal.

The headset jack 970D is configured to connect to a wired headset. The headset jack 970D may be the USB interface 930, or may be a 3.5 millimeter (mm) open mobile terminal platform (OMTP) standard interface or a cellular telecommunications industry association of the United States of America (USA) (CTIA) standard interface.

The pressure sensor 980A is configured to sense a pressure signal, and can convert the pressure signal into an electrical signal. In some embodiments, the pressure sensor 980A may be disposed on the display 993. There is a plurality of types of pressure sensors 980A, such as a resistive pressure sensor, an inductive pressure sensor, a capacitive pressure sensor, and the like.

The gyroscope sensor 980B may be configured to determine a motion posture of the terminal device 900. In some embodiments, angular velocities of the terminal device 900 around three axes (namely, x, y, and z axes) may be determined by using the gyroscope sensor 980B.

The fingerprint sensor 980C is configured to collect a fingerprint. The terminal device 900 may implement fingerprint unlocking, application lock access, and the like by using a feature of a collected fingerprint.

The touch sensor 980D is also referred to as a touch panel. The touch sensor 980D may be disposed in the display 993, and the touch sensor 980D and the display 993 form a touchscreen, which is also referred to as a "touch control screen". The touch sensor 980D is configured to detect a touch operation performed on or near the touch sensor. The touch sensor may transfer the detected touch operation to the application processor to determine a type of the touch event. A visual output related to the touch operation may be provided by using the display 993. In some other embodiments, the touch sensor 980D may alternatively be disposed on a surface of the terminal device 900 at a location different from a location of the display 993.

The ambient light sensor 980E is configured to sense ambient light brightness. The terminal device 900 may adaptively adjust brightness of the display 993 based on the sensed ambient light brightness.

The button 990 includes a power button, a volume button, and the like. The button 990 may be a mechanical button or a touch button. The terminal device 900 may receive a button input, and generate a button signal input related to a user setting and function control of the terminal device 900.

The indicator 992 may be an indicator light, and may be configured to indicate a charging state and a power change, or may be configured to indicate a message, an incoming call, a notification, and the like.

The SIM card interface 995 is configured to connect to a SIM card. The SIM card can be inserted into the SIM card interface 995 or removed from the SIM card interface 995, to implement contact with or separation from the terminal device 900. In some embodiments, the terminal device 900 uses an eSIM, in other words, an embedded SIM card. The eSIM card can be embedded in the terminal device 900, and cannot be separated from the terminal device 900.

A software system of the terminal device 900 may use a layered architecture, an event-driven architecture, a microkernel architecture, a microservice architecture, a cloud architecture, or the like. In embodiments of this disclosure, an ANDROID system with the layered architecture is used as an example to describe the software structure of the terminal device 900.

Figure 4:
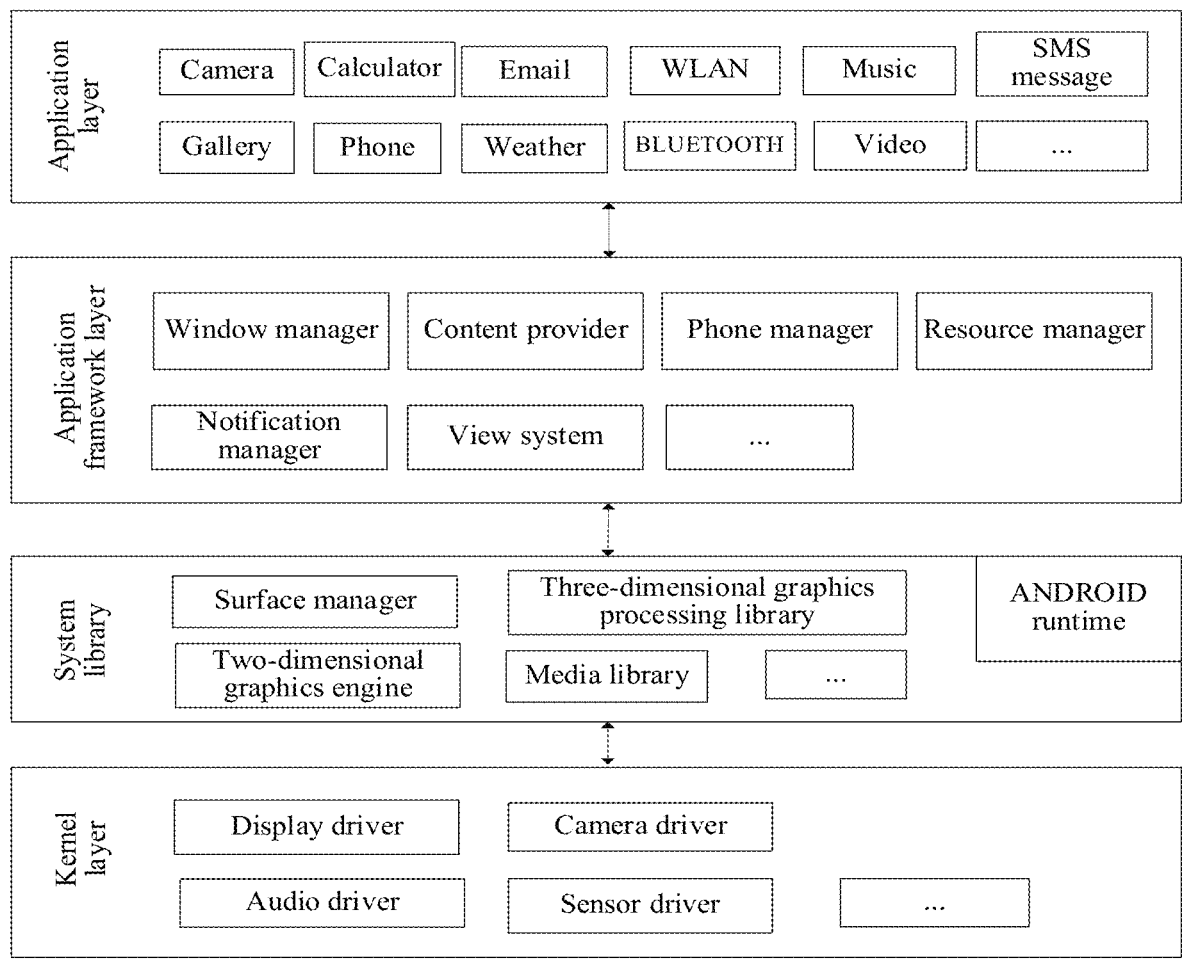
FIG. 4 is a schematic diagram of a software architecture according to an embodiment of this disclosure.

FIG. 4 is a block diagram of a software structure of a terminal device 900 according to an embodiment of this disclosure.

In a layered architecture, software is divided into several layers, and each layer has a clear role and task. The layers communicate with each other through a software interface. In some embodiments, the ANDROID system is divided into four layers: an application layer, an application framework layer, an ANDROID runtime and system library, and a kernel layer from top to bottom.

The application layer may include a series of application packages.

As shown in FIG. 4, the application package may include applications (or an application) such as weather, music, a calculator, an email, a camera, a gallery, a call, a wireless local area network (WLAN), BLUETOOTH, a video, and a Short Message/Messaging Service (SMS) message.

The application framework layer provides an application programming interface (API) and a programming framework for an application at the application layer. The application framework layer includes some predefined functions.

As shown in FIG. 4, the application framework layer may include a window manager, a content provider, a view system, a phone manager, a resource manager, a notification manager, and the like.

The window manager is configured to manage a window program. The window manager may obtain a size of the display, determine whether there is a status bar, perform screen locking, take a screenshot, and the like.

The content provider is configured to store and obtain data, and enable the data to be accessed by the application. The data may include a video, an image, audio, calls that are made and answered, a browsing history and bookmarks, a personal address book, and the like.

The view system includes visual controls such as a control for displaying a text and a control for displaying a picture. The view system may be configured to construct the application. A display screen may include one or more views. For example, a video playback interface including a video application may include a view for displaying the text and a view for displaying the picture.

The phone manager is configured to provide a communication function of the terminal device 900, for example, management of a call status (including answering, declining, or the like).

The resource manager provides various resources such as a localized character string, an icon, a picture, a layout file, a video file, and the like for an application.

The notification manager enables an application to display notification information in the status bar, and may be configured to convey a message of a notification type. The notification manager may automatically disappear after a short pause without requiring a user interaction. For example, the notification manager is configured to notify download completion, give a message notification, and the like. The notification manager may alternatively be a notification that appears in a top status bar of the system in a form of a graph or a scroll bar document, for example, a notification of an application running on the background, or may be a notification that appears on the display in a form of a dialog screen. For example, document information is displayed in the status bar, a prompt tone is given, the terminal device vibrates, an indicator light blinks, or the like.

The ANDROID runtime includes a kernel library and a virtual machine. The ANDROID runtime is responsible for scheduling and management of the ANDROID system.

The kernel library includes two parts: a function that needs to be called in JAVA language and a kernel library of ANDROID.

The application layer and the application framework layer run on the virtual machine. The virtual machine executes JAVA files of the application layer and the application framework layer as binary files. The virtual machine is configured to implement functions such as object lifecycle management, stack management, thread management, security and exception management, and garbage collection.

The system library may include a plurality of functional modules, for example, a surface manager, a media library, a three-dimensional (3D) graphics processing library (for example, OpenGL Embedded System (ES)), and a two-dimensional (2D) graphics engine (for example, SGL).

The surface manager is configured to manage a display subsystem and provide fusion of 2D and 3D layers for a plurality of applications.

The media library supports playback and recording in a plurality of commonly used audio and video formats, and static image files. The media library may support a plurality of audio and video coding formats, for example, MPEG-4, H.264, MPEG-1 Audio Layer III or MPEG-2 Audio Layer III (MP3), Advanced Audio Coding (AAC), Adaptive Multi-Rate (AMR), Joint Photographic Experts Group (JPEG), and Portable Network Graphics (PNG).

The 3D graphics processing library is configured to implement three-dimensional graphics drawing, image rendering, composition, layer processing, and the like.

The 2D graphics engine is a drawing engine for 2D drawing.

The kernel layer is a layer between hardware and software. The kernel layer includes at least a display driver, a camera driver, an audio driver, and a sensor driver.

Based on the foregoing video playback system, an embodiment of a video playback method in this disclosure is provided.

Figure 5:
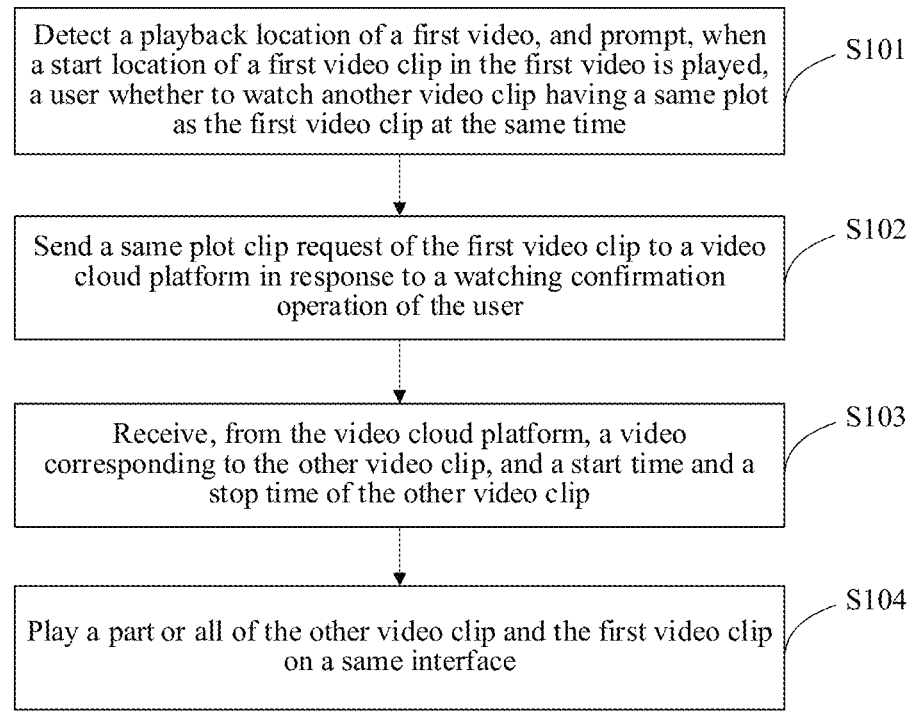
FIG. 5 is a schematic flowchart of a video playback method according to an embodiment of this disclosure.

FIG. 5 is a schematic flowchart of a video playback method according to an embodiment of this disclosure. The method is applied to a terminal device 900. The method includes the following steps.

S101: Detect a playback location of a first video, and prompt, when a start location of a first video clip in the first video is played, a user whether to watch another video clip having a same plot as the first video clip at the same time.

It should be noted that the first video has at least one related version video. The related version videos are different movie and video versions adapted from a same story (including a same novel, game, cartoon, or the like). For example, different versions videos such as a TV series version, a movie version, an animation version, a game version video or the like are adapted from the same novel. The related version video of the first video includes the other video clip having the same plot as the first video clip.

The following describes a user prompting manner in this embodiment of this disclosure (an example in which the terminal device 900 is a smartphone is used for description).

Figure 6:
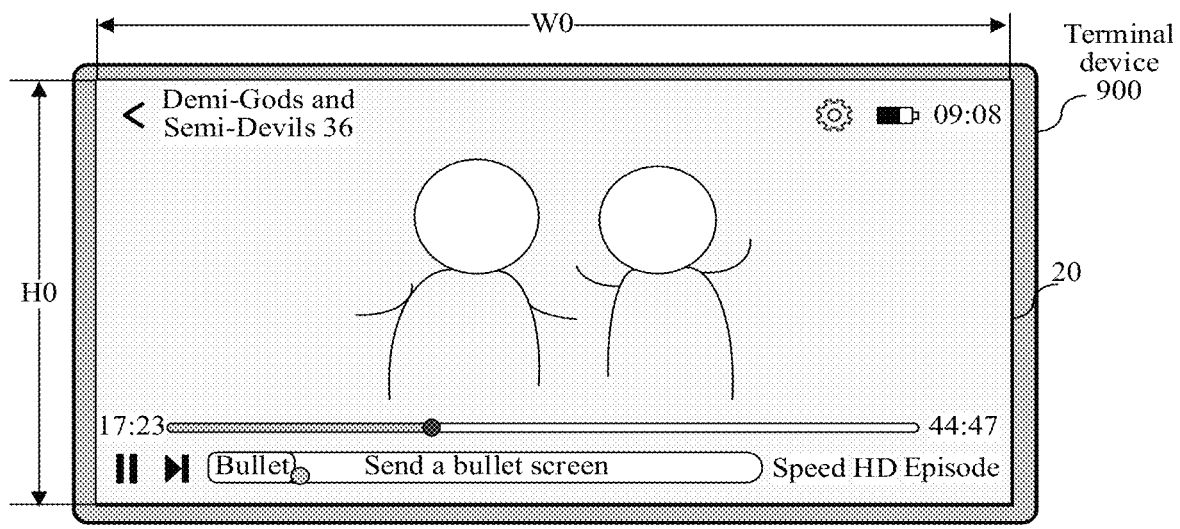
FIG. 6 is a schematic diagram of a video playback interface according to an embodiment of this disclosure.

For example, as shown in FIG. 6, a video playback interface 20 is displayed on a display of a terminal device 900, and a width of the video playback interface 20 is W0 and a height of the video playback interface 20 is H0. It can be learned that the terminal device 900 is playing the $36^{th}$ episode of Demi-Gods and Semi-Devils of the 97 version in a full screen manner (that is, the entire video playback interface 20 is used as a playback region of a current video), and duration of the entire episode is 44 minutes and 47 seconds. The current video may be used as the first video in this embodiment of this disclosure. The first video includes a video clip of a plot of "Sweeping Monk fights in Shaolin Temple". Herein, the video clip is used as the first video clip, and a start location and an end location of the first video clip in the first video are 17 minutes and 23 seconds and 22 minutes and 57 seconds respectively. When the start location of the first video clip in the first video is played (or a prompt may be given before the start location of the first video clip), the terminal device 900 prompts the user whether to watch another video clip having the same plot as the first video clip at the same time. This may have the following several manners.

Figure 7A:
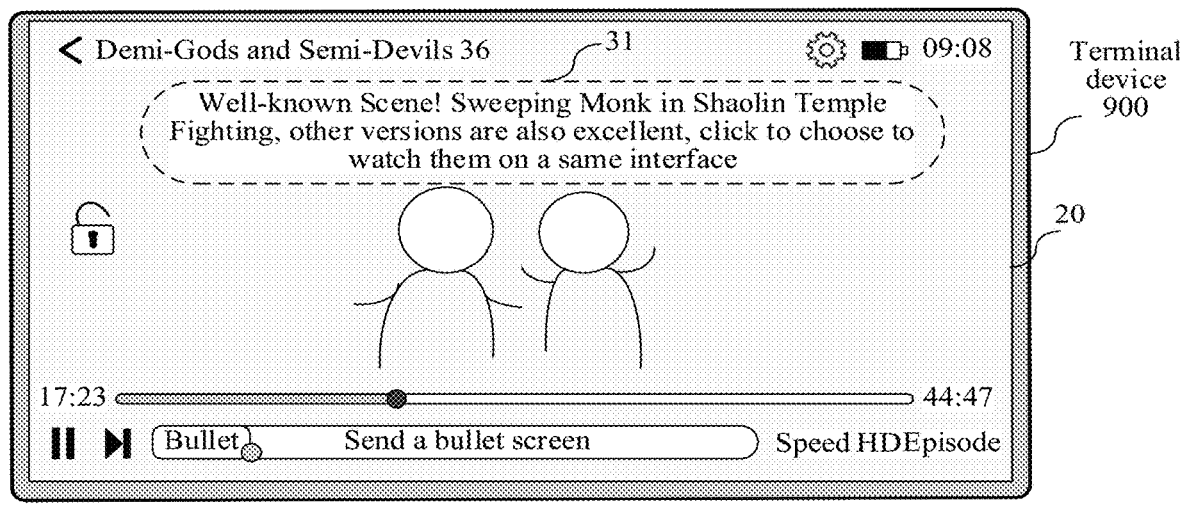
FIG. 7A and FIG. 7B are schematic diagrams of user prompting manners according to an embodiment of this disclosure.

(1) Prompt the user in a form of a bullet screen. For example, as shown in FIG. 7A, the video playback interface 20 displays a bullet screen 31 of "Well-known Scene! Sweeping Monk fights in Shaolin Temple. Other versions are also excellent. Click to choose to watch the same screen". The user may confirm watching by tapping the bullet screen 31. If no tapping operation of the user is detected within the display time of the bullet screen 31, the first video continues to be played in the video playback interface 20.

Figure 7B:
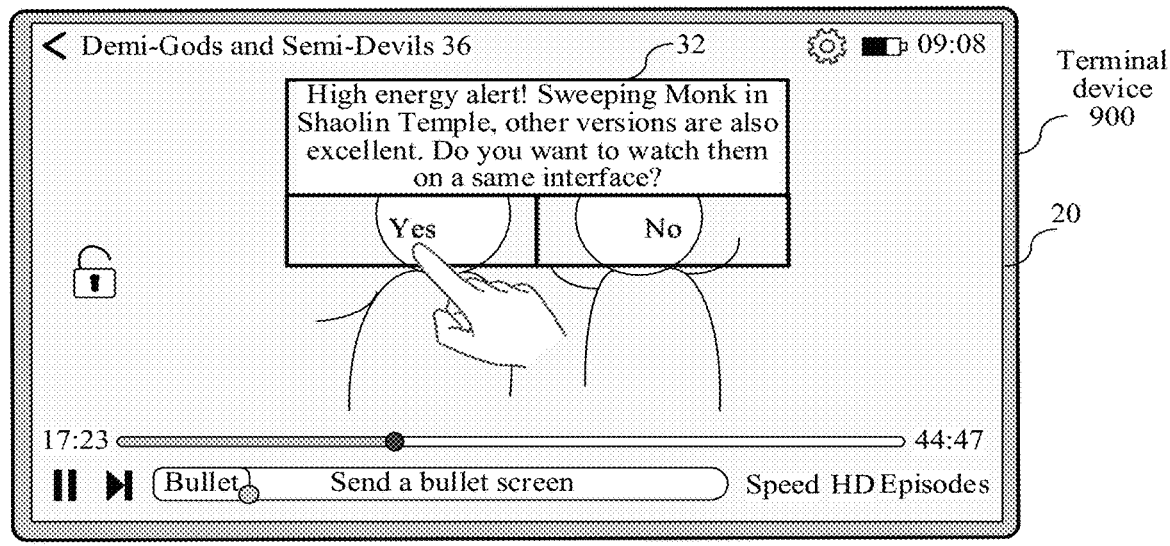

(2) Prompt the user in a form of a dialog box. As shown in FIG. 7B, a dialog box 32 appears in the video playback interface 20, and the dialog box 32 includes a text of "High energy alert! Sweeping Monk fights in Shaolin Temple. Other versions are also excellent. Do you want to watch them at the same time?" You can click "Yes" in the dialog box to confirm the operation. Similarly, if no confirmation operation of the user is detected within a set display time or that the user taps "No" is detected, the dialog box 32 disappears, and the first video continues to be played in the video playback interface 20.

It should be noted that, in addition to the foregoing two user prompting manners, the terminal device 900 may further use another prompting manner. For example, the terminal device 900 may send a voice prompt to ask the user whether to watch the other video clip having a same plot as the first video clip at the same time, then receive a voice signal input by the user, and determine, based on the voice signal, whether the user confirms to watch. Certainly, the terminal device 900 may further have more other prompt manners, specific prompt content may be adjusted, and there may be a plurality of operation manners of the user. This is not limited in this disclosure.

In a possible embodiment, before detecting the playback location of the first video, the terminal device 900 sends a watching request of the first video to the video cloud platform 200, receives the first video, and a start location and an end location of the first video clip from the video cloud platform 200, and plays the first video. It may be understood that, after the user inputs the watching request of the first video by using the terminal device 900, the terminal device 900 sends the watching request of the first video to the video cloud platform 200, and then receives the first video, and the start location and the end location of the first video clip from the video cloud platform 200, so that the terminal device 900 can detect the playback location of the first video, and then provide, when the first video clip is played, a corresponding prompt. This caters to an association psychology of the user for the same plot clip.

S102: Send a same plot clip request of the first video clip to the video cloud platform 200 in response to the confirmation operation of the user.

A confirmation manner of the user is not limited in this embodiment of this disclosure.

S103: Receive, from the video cloud platform 200, a video corresponding to another video clip, and a start time and a stop time of the other video clip.

The start time and the stop time include a start location and an end location. It should be noted that, the video corresponding to the other video clip and the first video herein are related version videos of each other, and the videos include a plurality of video clips having the same plot. A plurality of related version videos may be in a one-to-one correspondence with the plurality of video clips having the same plot.

In a possible embodiment, the terminal device 900 receives a part or all another video clip from the video cloud platform 200. In other words, the video cloud platform 200 only sends the corresponding video clip to the terminal device 900, but does not send a complete video corresponding to each video clip.

S104: Play a part or all of the other video clip and the first video clip on a same interface.

In other words, a plurality of video clips having the same plot that include the first video clip are played on a same interface (that is, split-screen and simultaneous-display playback).

The following describes a manner in which the plurality of video clips having the same plot are played on the same interface in this embodiment of this disclosure.

Figure 8A:
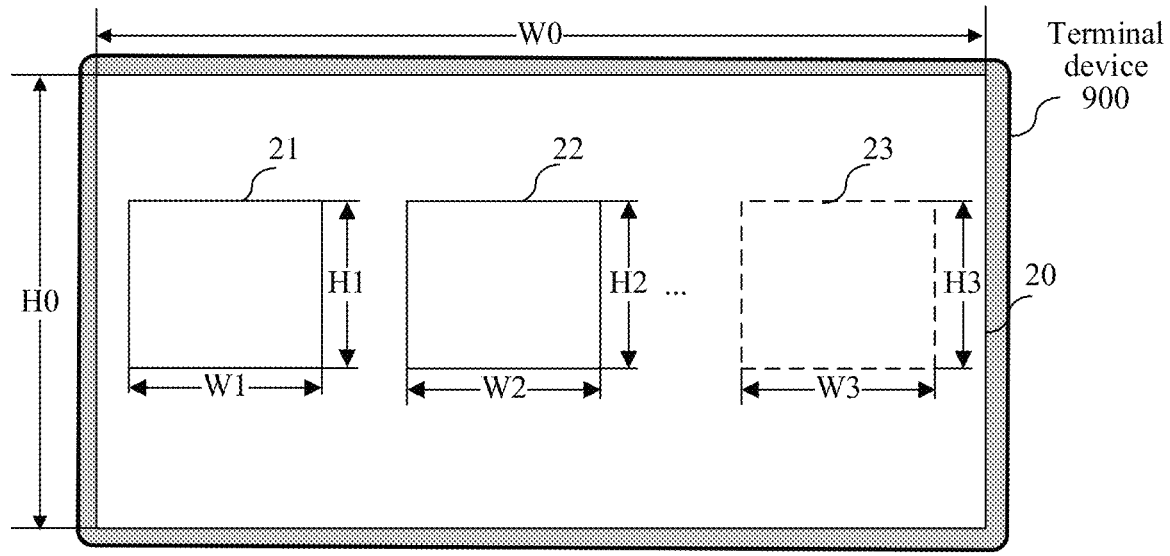
FIG. 8A, FIG. 8B, FIG. 8C, FIG. 8D, FIG. 8E, FIG. 8F, FIG. 8G, and FIG. 8H are schematic diagrams of a group of video playback interfaces according to an embodiment of this disclosure.

As shown in FIG. 8A, the video playback interface 20 is displayed on the display of the terminal device 900, and the width of the video playback interface 20 is W0 and the height of the video playback interface 20 is H0. The video playback interface 20 includes a first playback region 21 and a second playback region 22. A width and a height of the first playback region 21 are respectively W1 and H1, and a width and a height of the second playback region are respectively W2 and H2, where 0<H1≤H0, 0<H2≤H0, 0<W1≤W0, and 0<W2≤W0. The first video clip is displayed in the first playback region 21, and a second video clip in a second video is displayed in the second playback region. The first video and the second video are related version videos, and the second video clip is another video clip having the same plot as the first video clip.

In a possible embodiment, as shown in FIG. 8A, a size of the first playback region 21 is the same as a size of the second playback region 22, that is, W1=W2 and H1=H2.

Figure 8B:
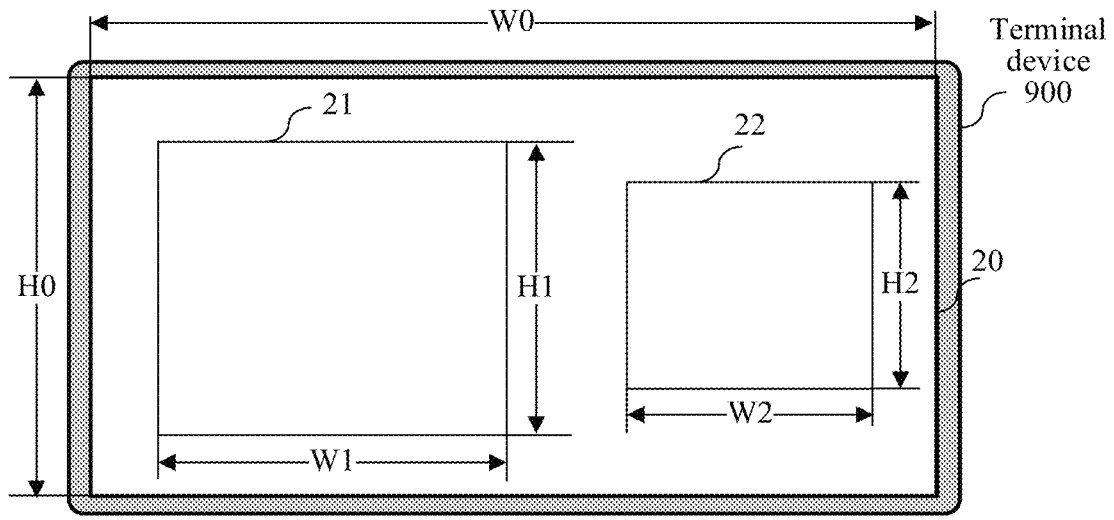

In another possible embodiment, as shown in FIG. 8B, the size of the first playback region 21 is different from the size of the second playback region 22, that is, W1≠W2 and/or H1≠H2.

In a possible embodiment, as shown in FIG. 8A, the first playback region 21 and the second playback region 22 present a left-right location relationship. It may be understood that when W1+W2=W0, and H1=H2=H0, the first playback region 21 and the second playback region 22 exactly fill the video playback interface 20.

Figure 8C:
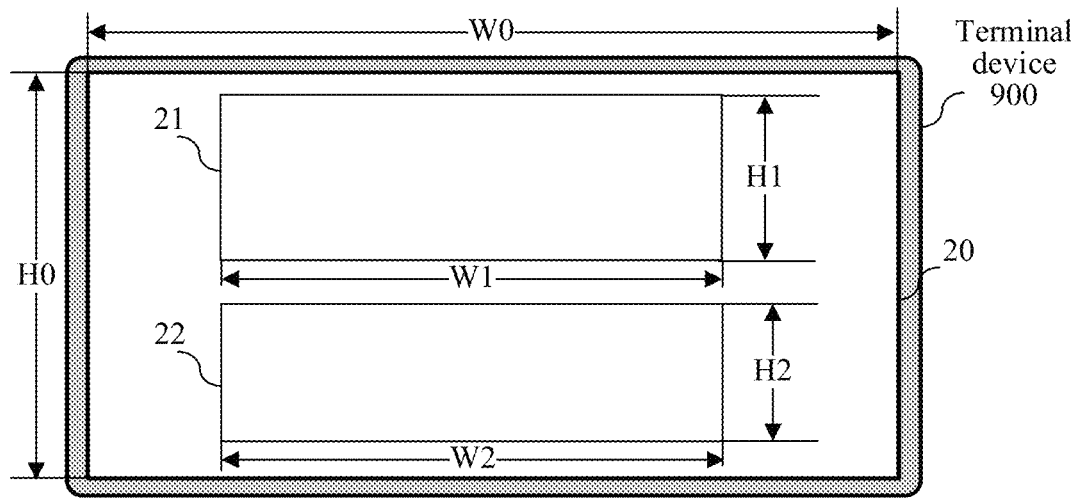

In another possible embodiment, as shown in FIG. 8C, the first playback region 21 and the second playback region 22 present a top-down location relationship.

Figure 8D:
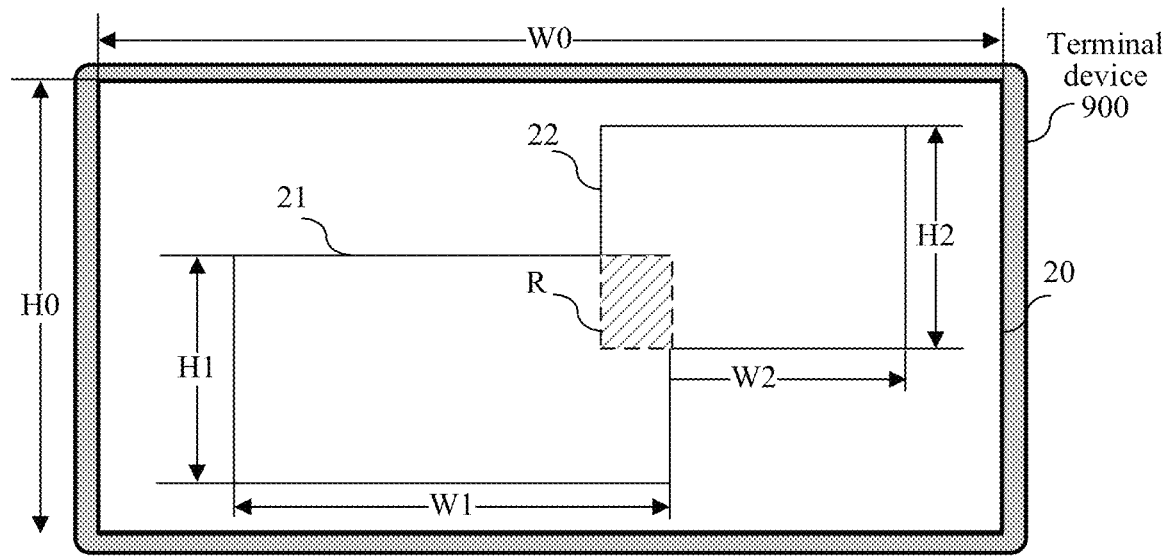

In a possible embodiment, the first playback region 21 and the second playback region 22 present a diagonal location relationship. For example, as shown in FIG. 8D, the first playback region 21 is located in a lower left corner of the video playback interface 20, the second playback region 22 is located in an upper right corner of the video playback interface 20, and the first playback region 21 and the second playback region 22 present the diagonal location relationship. Certainly, there may be a diagonal location relationship different from that shown in FIG. 8D.

In a possible embodiment, as shown in FIG. 8A, the video playback interface 20 may further include a third playback region 23, a width and a height of the third playback region 23 are respectively W3 and H3, 0<H3≤H0, and 0<W3≤W0. A third video clip in a third video is displayed in the third playback region 23. The third video, the first video, and the second video are related version videos, and the third video clip is a video clip having the same plot as the first video clip and the second video clip. The first playback region 21, the second playback region 22, and the third playback region 23 may be horizontally arranged in a manner shown in FIG. 8A, or may be vertically arranged, or may be arranged in a diagonal manner.

Figure 8E:
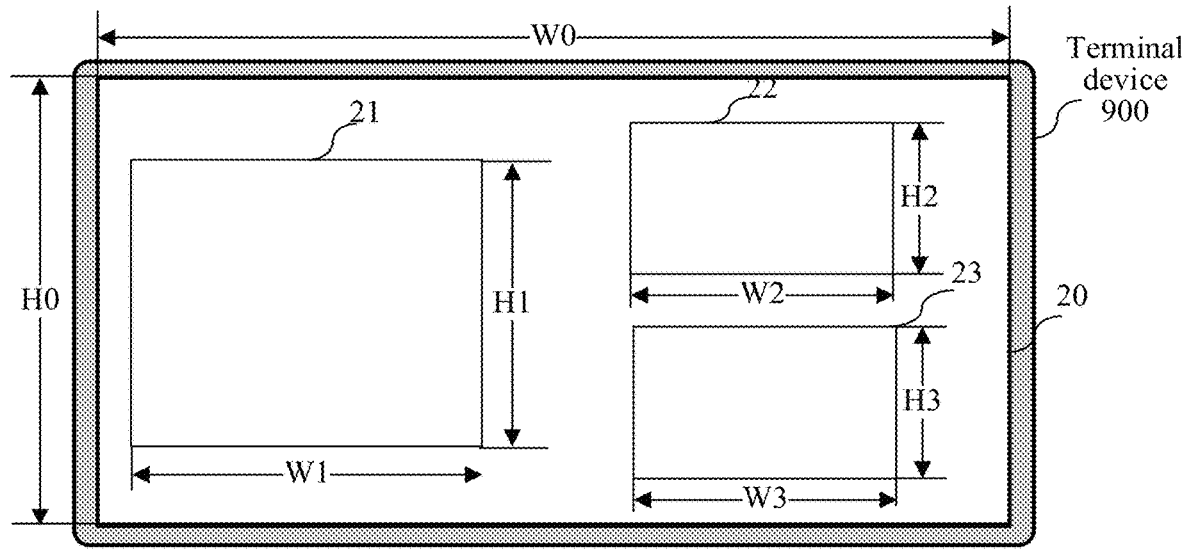

In a possible embodiment, the first playback region 21, the second playback region 22, and the third playback region 23 present a location relationship shown in FIG. 8E. The first playback region 21 is located on the left side of the video playback interface 20, the second playback region 22 and the third playback region 23 are both located on the right side of the video playback interface 20 and present a top-down location relationship. It may be understood that the video playback interface 20 may further include more playback regions, and different video clips having the same plot as the first video clip are respectively displayed in the playback regions. The playback regions may present various different location relationships. The location relationships are not listed one by one herein for brevity of the specification. Sizes of the playback regions may be the same or may be different.

In a possible embodiment, a remaining region in the video playback interface 20 other than each playback region may be filled by using a black edge, a picture, or the like.

In a possible embodiment, after a playback region is closed, a size and a location of a remaining playback region may be automatically adjusted. For example, as shown in FIG. 8E, the video playback interface 20 includes the first video playback region 21, the second playback region 22, and the third playback region 23. When the user chooses to close the third playback region 23, the video playback interface 20 changes from FIG. 8E to FIG. 8B. To be specific, the third playback region 23 is closed, a location of the second playback region 22 changes from the lower right corner of the video playback interface 20 to the right side, and both the first playback region 21 and the second playback region 22 are zoomed in, to better adapt to the video playback interface 20.

In a possible embodiment, the playback regions may overlap. As shown in FIG. 8D, the first playback region 21 and the second playback region 22 partially overlap, and an overlapping region R is a part filled with slashes in the figure.

Figure 8F:
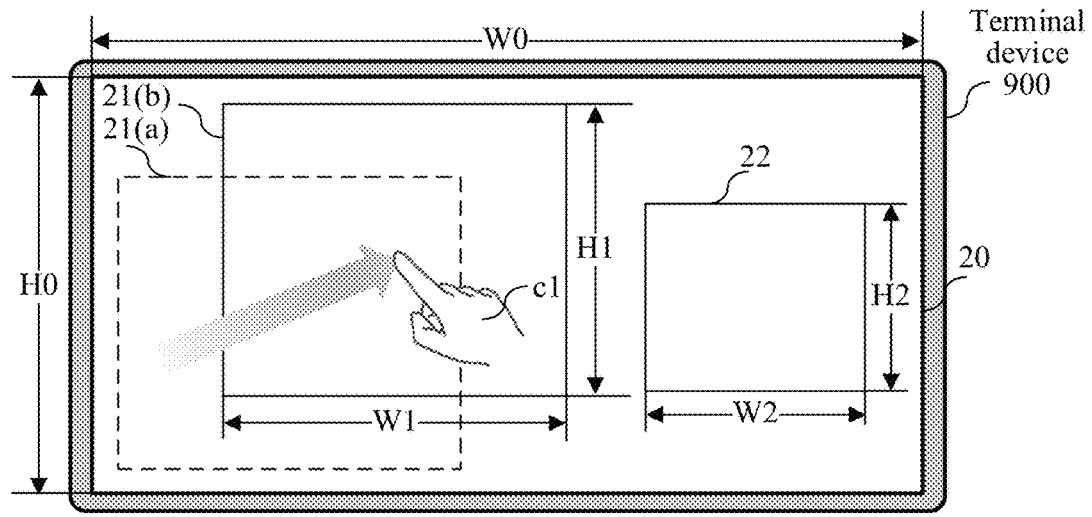

In a possible embodiment, a location of each playback region may be adjusted. For example, a location of the first playback region 21 is adjusted. Referring to FIG. 8F, the terminal device 900 adjusts the first playback region 21 from a first location 21(a) depicted by dashed lines to a second location 21(b) in response to a location adjustment operation c1 (for example, long pressing the first playback region 21 and dragging the first playback region 21 in a direction of an arrow) of the user.

Figure 8G:
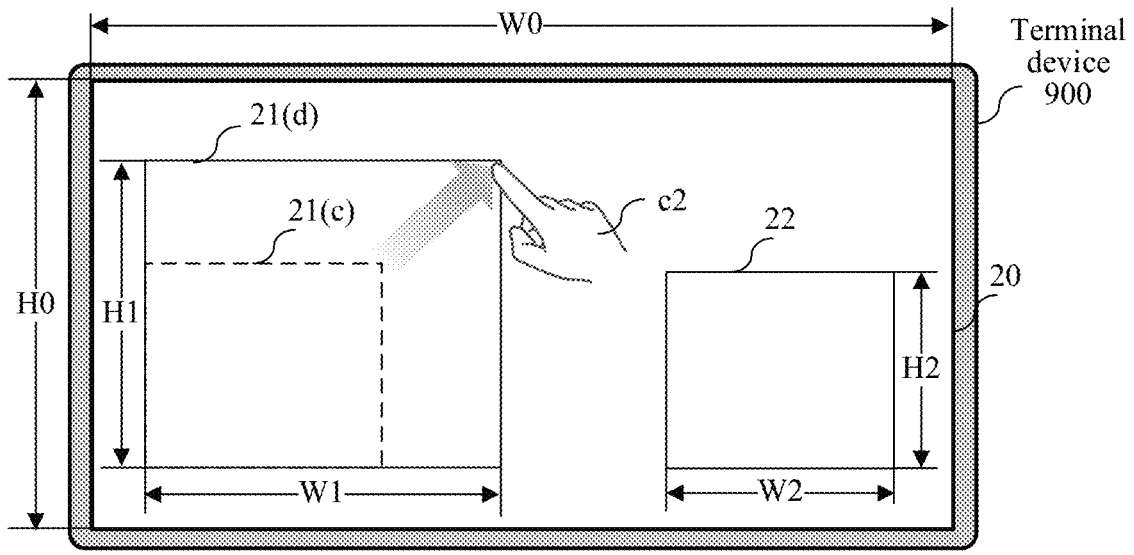

In a possible embodiment, the size of each playback region may be adjusted. For example, a size of the first playback region 21 is adjusted. Referring to FIG. 8G, the terminal device 900 adjusts the first playback region 21 from a first area 21(c) depicted by dashed lines to a second area 21(d) in response to a size adjustment operation c2 of the user (for example, long pressing an upper right corner of the first playback region 21 and dragging the upper right corner in a direction of an arrow). The first area 21(c) is not equal to the second area 21(d). To be specific, the first playback region 21 may be zoomed in by using this operation, or the first playback region 21 may be zoomed out. The width-to-height ratio (W1/H1) of the first playback region 21 before and after a change may be the same, or may be different, that is, the first playback region 21 may be zoomed in or zoomed out proportionally, or may be different from an original proportion. Certainly, there may be another user operation manner, for example, two fingers drag the first playback region 21 to zoom in or zoom out.

Operations of other playback regions are similar. The user may separately adjust the location and/or the size of each playback region, or may choose to close any one or more playback regions. In addition to the long pressing and dragging operations described above, there may be another user operation manner. This is not limited in this disclosure. Certainly, the terminal device 900 may alternatively automatically adjust the location and the size of each playback region based on a quantity of video clips that need to be played and an image ratio of the video. In a possible embodiment, a quantity of playback regions and the size of the playback region are alternatively set by the user.

In a possible embodiment, a sound of only one of the video clips may be played, and the other video clip is muted, to avoid mutual interference between the sounds of the video clips.

In a possible embodiment, the user may directly choose to display a video in a playback region in a full screen manner.

In a possible embodiment, if there are a plurality of video clips having the same plot, the video clips may be sorted in descending order of scores of corresponding videos, and a set quantity of video clips that rank in the top are respectively displayed in different playback regions.

Figure 8H:
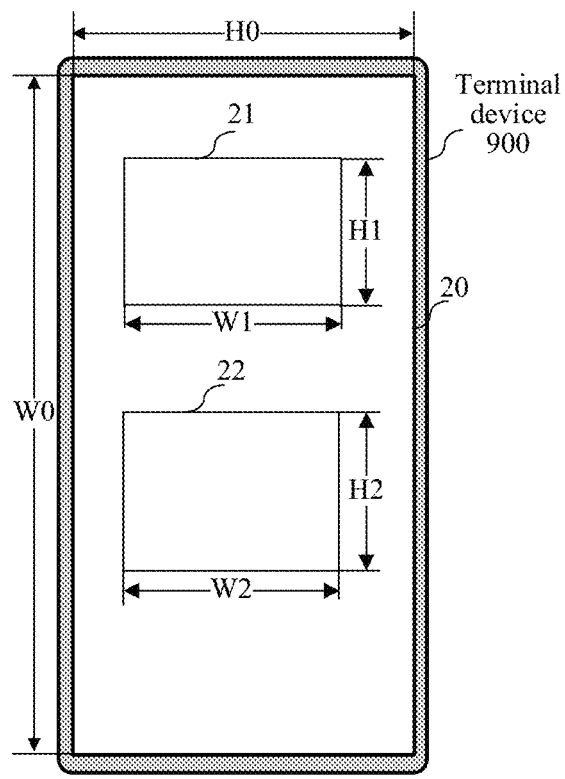

It should be noted that the foregoing embodiments are described when the terminal device 900 performs landscape playback, and actually, portrait playback may be alternatively performed. As shown in FIG. 8H, in a case of portrait playback, the first playback region 21 and the second playback region 22 are displayed on the video playback interface 20, a width and a height of the first playback region 21 are respectively W1 and H1, and a width and a height of the second playback region are respectively W2 and H2, where $0<H1 \leq W0$, $0<H2 \leq W0$, $0<W1 \leq H0$, and $0<W2 \leq H0$. The first video clip is displayed in the first playback region 21, and the second video clip is displayed in the second playback region 22. It should be understood that a quantity of playback regions in the case of portrait playback and a location, a size, an adjustment manner, and the like of each playback region are similar to those in the case of landscape playback, and an implementation is similar. For brevity of the specification, the implementations are not listed one by one.

In a possible embodiment, the plurality of video clips having the same plot may be played on different displays of a same terminal device 900.

In a possible embodiment, each playback region may include some controls configured to control content played in each playback region. The following uses an example in which the first video is played in the first playback region 21 to describe various controls included in each playback region and related operations.

Figure 9A:
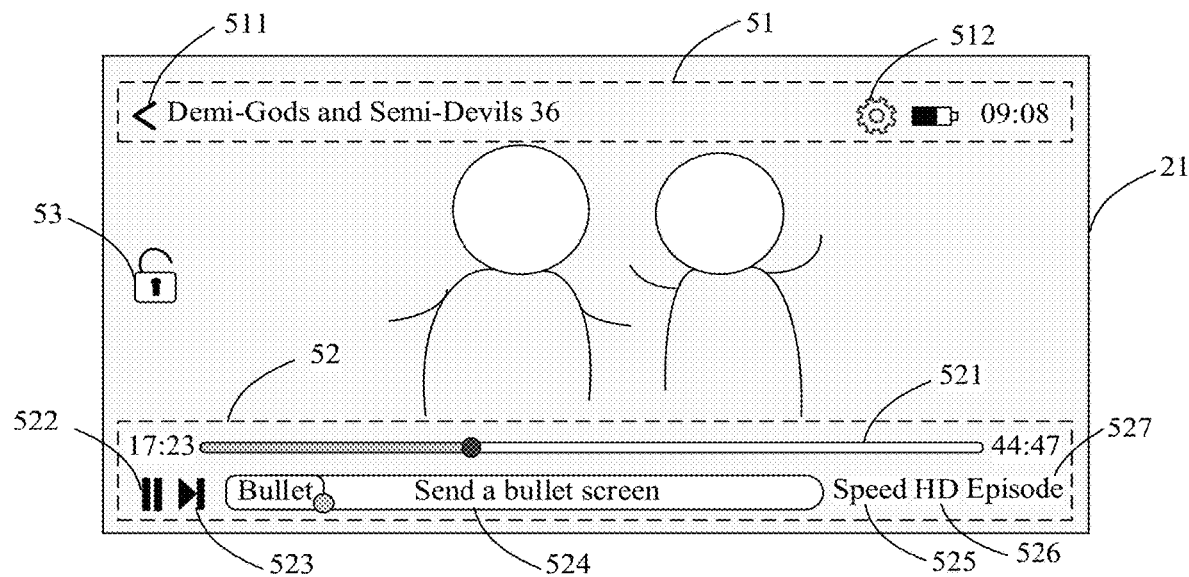
FIG. 9A, FIG. 9B, FIG. 9C, and FIG. 9D are schematic diagrams of a group of video playback control methods according to an embodiment of this disclosure.

As shown in FIG. 9A, the first playback region 21 includes a top operation bar 51, a bottom operation bar 52, and a screen locking control 53.

The top operation bar 51 includes a return control 511, a setting control 512, and other icons (for example, a video title, a power icon, a time icon, and the like).

The return control 511 is used to exit a current video, and may directly close a current playback region, or may return to a previous interface.

The setting control 512 is configured to set an image ratio of the current video, and the like. Caching the current video, adding the current video to favorites, sharing the current video, and the like may further be chosen in the setting control 512.

The bottom operation bar 52 includes a progress bar 521, a playback control 522, a next episode control 523, a bullet screen control 524, a speed control 525, a definition control 526, and an episode choosing control 527.

Figure 9B:
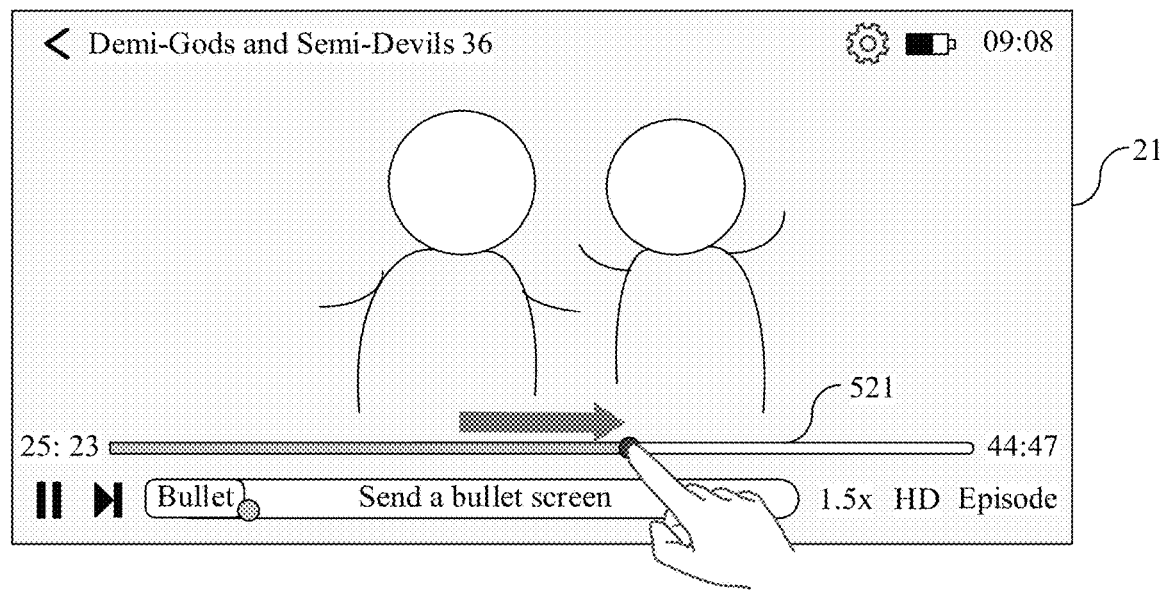

The progress bar 521 is used to display total duration of the current video and a current playback location, and the user may further control a playback location of the current video by using the progress bar 521. For example, as shown in FIG. 9A, a left end of the progress bar 521 shows that the current video is played to 17 minutes and 23 seconds. As shown in FIG. 9B, the user long presses the progress bar 521 and drags the progress bar to a location of 25 minutes and 23 seconds based on a direction of an arrow, so that the current video starts to be played from a new location (25:23) in the first playback region 21.

The playback control 522 is configured to control playing or pausing of the current video. Certainly, the user may further implement playing or pausing by performing an operation such as double-clicking the first playback region 21. This is not limited in this disclosure.

The next episode control 523 is configured to switch to a next video of the current video.

The bullet screen control 524 is configured to control whether to enable the bullet screen. If the bullet screen control 524 is set to an on state, a bullet screen appears in the first playback region 21, and the user may further enter a text in an input bar of the bullet screen control 524 and send a bullet screen, or if the bullet screen control 524 is set to an off state, no bullet screen is displayed in the first playback region 21. Certainly, a size, a location, a color, transparency, and the like of the bullet screen may be further set.

Figure 9C:
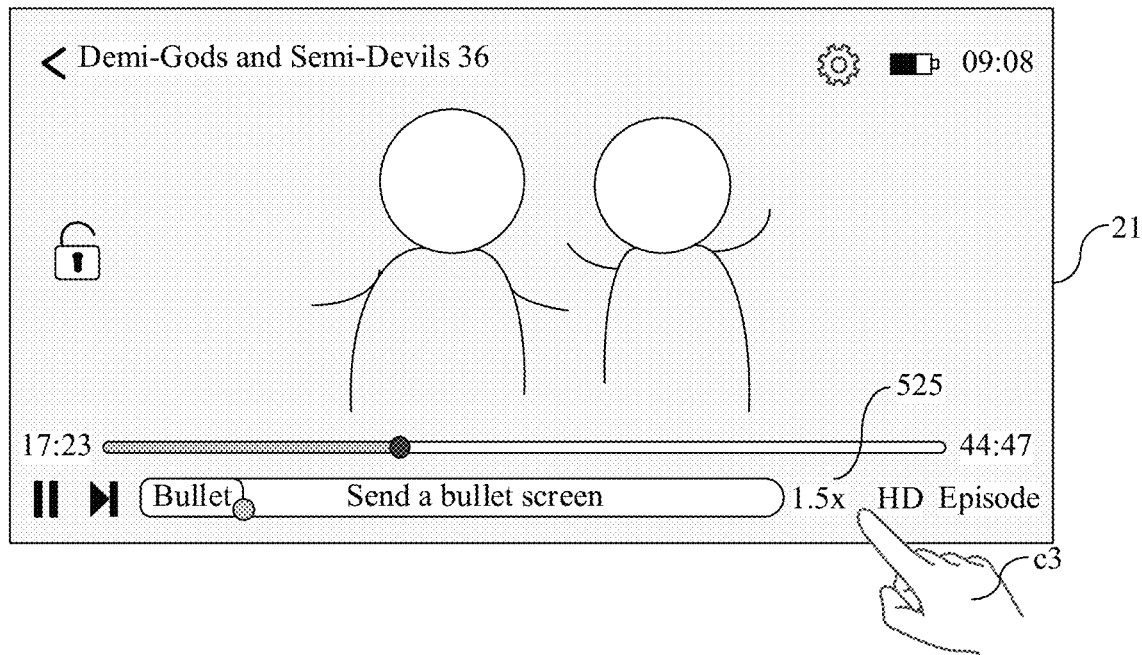

The speed control 525 is used to control a playback speed of the current video. For example, as shown in FIG. 9C, the terminal device 900 receives an input operation c3 (for example, click) of the user on the speed control 525, the speed control 525 changes from "speed" to "1.5×", and the current video starts to be played at 1.5 speed. Certainly, the current video may be alternatively adjusted to be played at another speed, for example, 0.5×, 1.25×, or the like.

The definition control 526 is configured to choose a definition of the current video. For example, in FIG. 9A, "high definition" is chosen, and the user may alternatively choose a definition such as "standard definition", "full high definition", or the like to play the current video.

The episode choosing control 527 is configured to choose an episode to be watched. As shown in FIG. 9A, a currently chosen episode is a 36$^{th}$ episode of Demi-Gods and Semi-Devils, and a name and a serial number of the episode of the current video are displayed in the top operation bar 51.

The screen locking control 53 is configured to lock a screen and hide another operation control to avoid accidental touch.

Figure 9D:
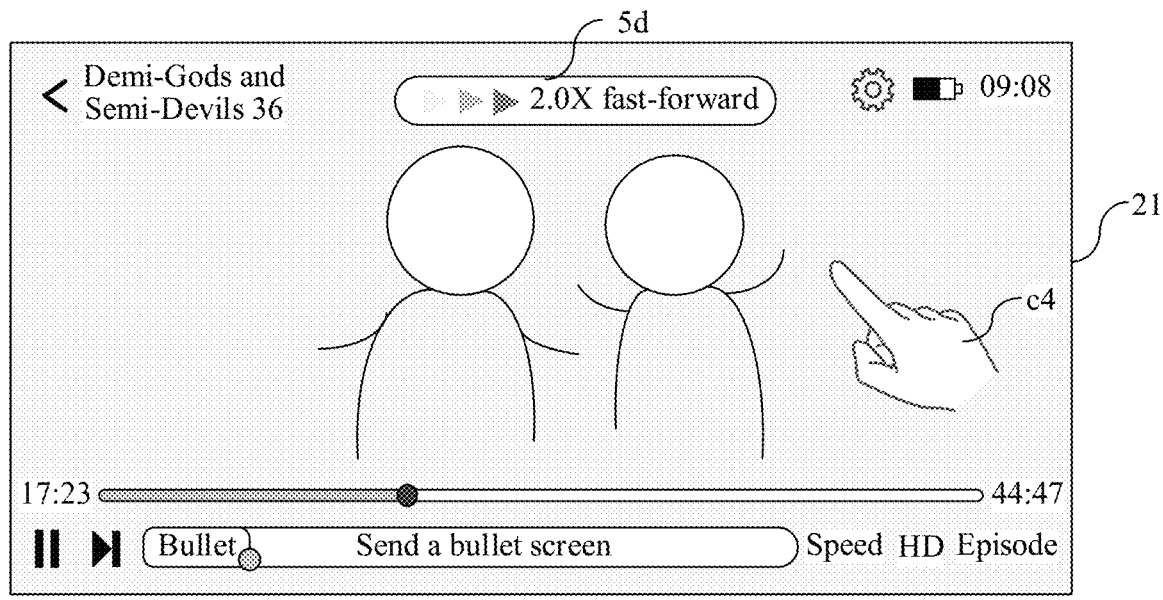

In a possible embodiment, an acceleration operation may be performed on the current video. For example, as shown in FIG. 9D, the terminal device 900 detects a long pressing operation c4 performed by the user on the first playback region 21, and then displays an acceleration icon 5*d* in the first playback region 21, and the current video starts to be played at a speed of 2× (or another speed). When the user ends the long pressing operation c4, the acceleration icon 5*d* disappears, the current video stops being played at an accelerated speed, and an original playback speed is restored.

It may be understood that, in each playback region, the video may be played based on an original image ratio of the video, or a video image may be stretched correspondingly, or the entire playback region is directly covered, and the user may alternatively adjust the image ratio of the video. A size of each playback region may be adaptively adjusted based on a quantity of videos that need to be played and the original image ratio of the video, to prevent the video image from being stretched and distorted.

It should be understood that the user may separately control each playback region, and a control manner of each playback region is the same as the operation manner of the first playback region 21 described above. It should be noted that FIG. 9A to FIG. 9D are merely examples of schematic diagrams of playback regions. The playback region may further include more or fewer controls. The control may be presented in another form, and the user may operate the controls in different manners. This is not limited in this disclosure.

In a possible embodiment, after a part or all of the other video clip and the first video clip on the same interface is played, the method further includes the following. The terminal device 900 prompts, when playing of the first video clip and/or the other video clip is completed, the user whether to continue to watch the first video and/or the video corresponding to the other video clip, and continues to play, when the user chooses to continue to watch the first video and the video corresponding to the other video clip, the first video and the video corresponding to the other video clip, closes, when the user chooses to watch the first video, the video corresponding to the other video clip, or closes, when the user chooses to watch the video corresponding to the other video clip, the first video. It may be understood that, a manner similar to that described in step S101 may be used to prompt the user whether to continue to watch the first video and/or the video corresponding to the other video clip. A specific prompt manner, content, and a user operation manner are not limited in this disclosure.

In a possible embodiment, when a video clip is played, a playback region in which the video clip is located is directly closed without prompting the user. The locations and sizes of other playback regions can be automatically adjusted.

It may be understood that, the method in the foregoing steps S101 and S102 may also be implemented by using a video application, and the video application includes a background management module and a display module.

It can be learned that, in this embodiment of this disclosure, the first video and the start time and the stop time of the first video clip from the video cloud platform 200 are received, so that the terminal device 900 can detect the playback location of the first video in a process of playing the first video, and then prompts, when the start location of the first video clip in the first video is played, the user whether to watch the other video clip having the same plot as the first video. This caters to the association psychology of the user for the same plot clip. The terminal device 900 sends a request to the video cloud platform 200 in response to the confirmation operation of the user, and then receives the video corresponding to the other video clip and the start time and the stop time of each another video clip from the video cloud platform 200, and then plays the part or all of the other video clip and the first video clip on the same interface, to quickly implement split-screen and simultaneous-display playback of the plurality of video clips having the same plot, and provide intuitive comparison for the video clips having the same plot. In addition, when playing of the first video clip and/or the other video clip is completed, the user is prompted whether to continue to watch the first video and/or the video corresponding to the other video clip, and then the corresponding video is played based on the chosen of the user. This improves user experience.

Figure 10:
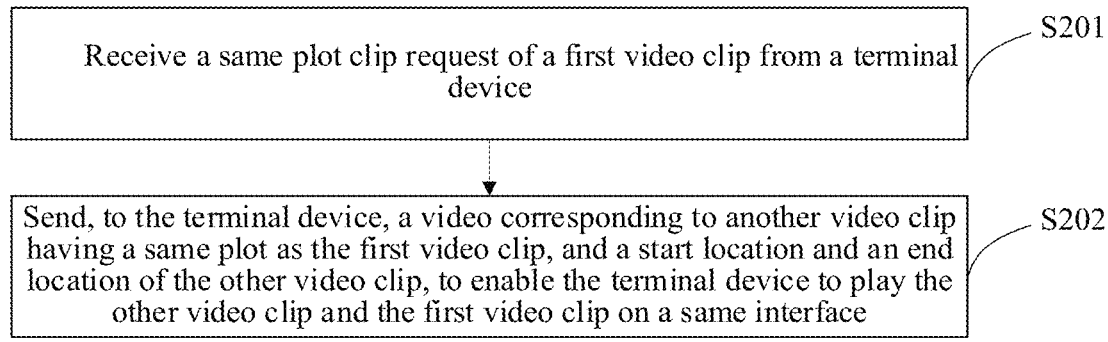
FIG. 10 is a schematic flowchart of another video playback method according to an embodiment of this disclosure.

FIG. 10 is a schematic flowchart of another video playback method according to an embodiment of this disclosure. The method is applied to a video cloud platform 200. The method includes the following steps.

S201: Receive a same plot clip request of a first video clip from a terminal device.

The first video clip is located in the first video. It should be noted that the first video has at least one related version video, and at least one another video clip having a same plot as the first video clip exists in the related version video.

In a possible embodiment, before receiving the same plot clip request of the first video clip from the terminal device 900, the video cloud platform 200 receives a watching request of the first video from the terminal device 900, and sends the first video, and a start location and an end location of the first video clip to the terminal device 900. In other words, after receiving the watching request of the first video from the terminal device 900, the video cloud platform 200 not only sends the first video to the terminal device 900, but also sends the start time and the stop time of the first video clip in the first video to the terminal device 900, so that the terminal device 900 can prompt, when the first video clip in the first video is played, a user whether to watch the other video clip having the same plot as the first video clip. This caters to an association psychology of the user.

In a possible embodiment, before the same plot clip request of the first video clip from the terminal device 900 is received, the method further includes obtaining a plurality of video clips having the same plot from a plurality of videos, and separately recording a start location and an end location of each video clip in the plurality of video clips having the same plot. The first video is any video in the plurality of videos, and the plurality of video clips having the same plot include the first video clip and the other video clip. That is, the plurality of videos are a plurality of related version videos of the first video, and the plurality of videos include the plurality of video clips having the same plot. It may be understood that, the plurality of video clips having the same plot may be identified in the plurality of videos in a manual manner, and the start location and the end location of each video clip (that is, the start time and the stop time of each video clip in a corresponding video) are marked, and then the plurality of video clips are associated as a set of video clips on which split-screen and simultaneous-display playback can be implemented. The plurality of videos may have a plurality of sets of video clips on which split-screen and simultaneous-display playback can be implemented, and each video set on which split-screen and simultaneous-display playback can be implemented includes the plurality of video clips having the same plot.

In a possible embodiment, that obtaining a plurality of video clips having the same plot from a plurality of videos includes obtaining a plurality of target type clips from the plurality of videos, and then obtaining the plurality of video clips having the same plot from the plurality of target type clips. It should be noted that the plurality of videos is a plurality of different movie versions adapted from a same story, and the plurality of videos usually have plurality of groups of video clips having the same plot, but not all video clips having the same plot easily cause the association psychology of the user. Therefore, in a possible embodiment, the plurality of target type clips may be first obtained from the plurality of videos, and then plurality of video clips having the same plot are obtained from the plurality of target type clips, in this way, all video clips do not need to be performed plot analysis. The target type clip is a video clip that meets a specific condition, and may be considered as a clip type that easily causes an association of the user. The condition may be set based on an actual requirement. This is not limited in this embodiment of this disclosure. For example, the target type clip may include some fierce fighting scenes in a movie and television drama, where the video clip usually includes exciting soundtracks, fast-switching shots, highly conflicting narrations, and the like, may also include some romantic scenes in a movie and television drama, where the video clip usually includes comforting soundtracks, some specific lines, and the like, and may further include some fierce gunshot clips, where such video clips often contain continuous gunshots, fast-switching shots, and the like. In this embodiment of this disclosure, a video clip that meets the foregoing feature/condition may be used as a target type clip, or the target type clip may be referred to as a highlight clip. The following describes how to determine, by using an artificial intelligence (AI) algorithm or a manual labeling manner, which video clip in the plurality of videos belongs to the target type clip. Certainly, a video clip that meets another condition may also be used as the target type clip based on an actual requirement. This is not limited in this disclosure.

In a possible embodiment, that obtaining a plurality of target type clips from the plurality of videos includes separately performing shot splitting on each video in the plurality of videos, to obtain a shot set corresponding to each video, separately performing shot clustering on the shot set of each video by using a cluster algorithm, to obtain a video clip set corresponding to each video, and separately inputting each video clip in the video clip set into a target type detection model, to obtain the plurality of target type clips. The following describes this embodiment in detail.

Figure 11:
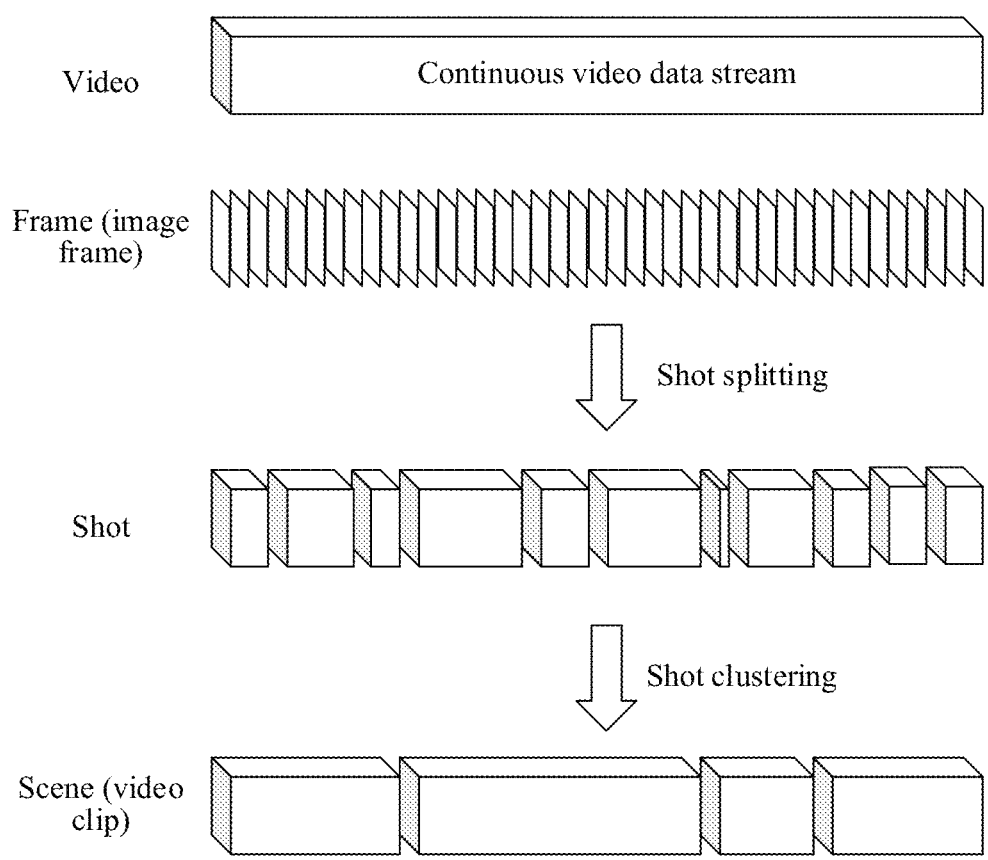
FIG. 11 is a schematic diagram of video structuring according to an embodiment of this disclosure.

First, a video structure is described. FIG. 11 is a schematic diagram of video structuring according to an embodiment of this disclosure. A hierarchical structure of a video includes a video, a scene, a shot, and a frame.

The video may be considered as a data stream formed by a series of image frames that are interdependent in terms of time.

The frame (or an image frame or a video frame) is a basic composition unit in a video data stream, and each frame may be considered as an independent static image. The video data stream is formed by these continuous image frames. The image frames that are continuous in terms of time are played continuously at an equal interval, to form a dynamic video. For example, in a phase alteration line (PAL) video format, a video sampling rate is 25 frames/second, that is, each second of a video includes 25 frames of images.

The shot is a continuous frame sequence captured by a single camera, and is a basic structure layer for further structuring the video data stream. The shot does not have or has weak semantic information, and emphasizes visual content similarity of the frame sequence. For example, in a dialog scene, the shot is switched between two heroes. A first hero included in a video is a shot, switching to the other hero forms another shot, and a shot boundary is between adjacent shots.

The scene (video clip) is a high-level abstract concept and semantic representation that are included by the video, and consists of several shots that are semantically related and adjacent in terms of time. A scene usually includes a complete plot. For example, a dialog scene includes a plot of communication between two persons.

In this embodiment of this disclosure, a video cloud platform 200 performs the following steps on each video in the plurality of videos, to obtain a target type clip included in each video.

1. Shot splitting. A current video is read, a shot boundary detection method is used to detect a shot boundary in the video, and then the video is split into a plurality of independent shots from the shot boundary, that is, a shot set corresponding to the current video is obtained. The current video is any video in the plurality of videos.

The shot boundary detection method includes a pixel difference method, a histogram boundary method, a block matching method, and the like. The shot boundary detection method is not limited in this disclosure. The following provides brief descriptions by using the histogram boundary method as an example. Generally, content of adjacent frames in a shot does not change greatly, and histograms are similar. The histogram boundary method uses this feature to determine whether there is shot shearing between two frames. In the histogram boundary method, grayscale, luminance, color, and the like of pixels of adjacent frames are first classified into N levels, and then a histogram is obtained through statistics collection of a quantity of pixels for each level for comparing. For example, it is assumed that color histograms of an $i^{th}$ frame $I_i$ and a $j^{th}$ frame $I_j$ of a video are $H_i$ and $H_j$ respectively, and a frame difference $d(I_i, I_j)$ may be calculated according to Formula (1):

$$d(I_i,I_j)=\Sigma_{n=0}^{N}\|H_i(n)-H_j(n)\| \quad (1)$$

N is a quantity of levels of color quantization, $H_i(n)$ represents a quantity of pixels of an $n^{th}$ color level of the $i^{th}$ frame, and $H_j(n)$ represents a quantity of pixels of the $n^{th}$ color level of the $j^{th}$ frame. If a histogram difference between two adjacent frames is large and $d(I_i, I_j)$ exceeds a set threshold, shot shearing occurs between the two frames and is considered as a shot boundary. If the histogram difference between two adjacent frames is small, it indicates that shot shearing does not occur. It should be noted that a formula for calculating a frame difference is not limited in this disclosure. Formula (1) is merely an example, and calculation may be performed by using another formula. For example, a histogram of each channel of an RGB image is obtained, and then two adjacent frames are compared based on histograms of a plurality of channels. It should be noted that this embodiment of this disclosure is not limited to comparing histograms of two adjacent frames in a video. Alternatively, the video may be sampled first, and histograms of extracted adjacent key frames are compared.

2. Shot clustering. A cluster algorithm is used to perform shot clustering on a plurality of shots in the shot set corresponding to the current video, to obtain video clips, that is, obtain a video clip set corresponding to the current video.

The cluster algorithm may use a K-means algorithm. Further, an average of all images in each shot is calculated first. For example, there are 50 images in a shot, and an average value is obtained for each pixel location of the 50 images, to obtain an average image corresponding to the shot. Then, a size of the average image is adjusted to a set size, and input into an Inception-V3 network (described below) to extract a feature vector corresponding to the shot. Then, the k-means algorithm is used to cluster feature vectors corresponding to a plurality of shots, and shots corresponding to feature vectors belonging to a same category are spliced into a video clip. Finally, the current video is divided into a plurality of video clips. It should be noted that, the cluster algorithm is not limited in this disclosure, and another cluster algorithm may be used to cluster the shot into video clips.

3. Target type clip determining. A target type detection model is used to determine whether each video clip in the video clip set of the current video belongs to the target type clip.

The target type detection model in this disclosure is implemented based on a graph neural network (GNN). First, the plurality of video clips is obtained, and a label that the video clip belongs to the target type or a label that the video clip does not belong to the target type is manually labeled on the video clips to obtain a sample set. The graph neural network is trained by using the sample set (input data of a graph neural network model includes an audio feature vector obtained by performing feature extraction on audio of the video clip and an image feature vector obtained by performing feature extraction on an image frame of the video clip, further, extraction may be separately performed by using a corresponding feature extraction network, and then the image feature vector and the audio feature vector are fused and then input into the graph neural network), and a parameter of the graph neural network is updated to obtain the target type detection model. Then, an unlabeled video clip is classified by using the target type detection model, the target type clip is identified, and a start time and a stop time that is of a video clip identified as the target type clip and that is in an original video is recorded. A type of the graph neural network is not limited in this disclosure, and may be any one of a graph convolutional network, a graph attention network, a graph self-coding machine, a graph generative network, or a graph time-space network.

In a possible embodiment, that obtaining the plurality of video clips having the same plot from the plurality of target type clips includes extracting audio, an image, and a subtitle document from a current target type clip, where the current target type clip is any target type clip in the plurality of target type clips, respectively inputting the audio, the image, and the subtitle document of the current target type clip into an audio feature extraction model, an image feature extraction model, and a document feature extraction model, to obtain a first audio feature vector, a first image feature vector, and a first document feature vector of the current target type clip, respectively inputting the first audio feature vector, the first image feature vector, and the first document feature vector of the current target type clip into an audio feature refinement model, an image feature refinement model, and a document feature refinement model, to obtain a second audio feature vector, a second image feature vector, and a second document feature vector of the current target type clip, performing vector splicing on the second audio feature vector, the second image feature vector, and the second document feature vector of the current target type clip, to obtain a fused feature vector of the current target type clip, inputting the fused feature vector of the current target type clip into a classification model, to obtain a first label of the current target type clip, extracting a keyword of the current target type clip, and combining the keyword and the first label, to obtain a second label of the current target type clip, and using the target type clip having the same second label as the plurality of video clips having the same plot. The following describes this embodiment in detail.

Figure 12:
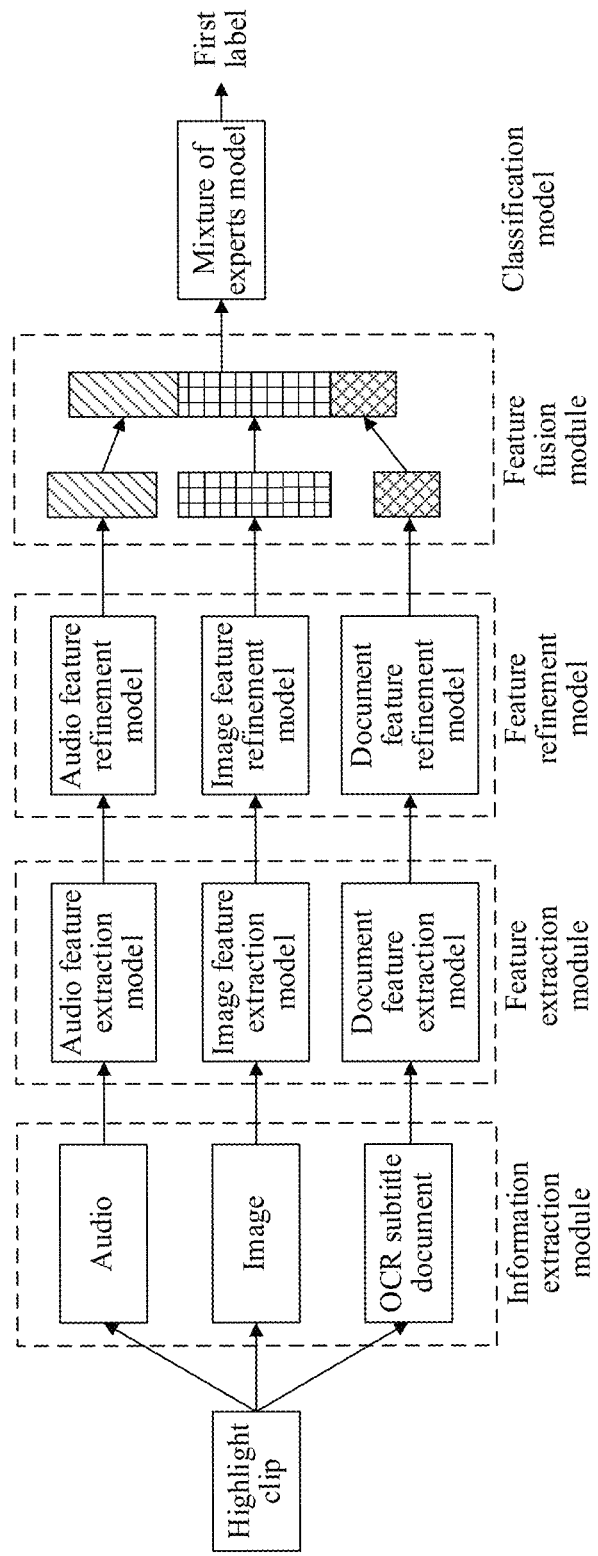
FIG. 12 is a diagram of an architecture of a multi-modal video analytics system according to an embodiment of this disclosure.

FIG. 12 is a diagram of an architecture of a multi-modal video analytics system according to an embodiment of this disclosure. The system includes an information extraction module, a feature extraction module, a feature refinement module, a feature fusion module, and a classification model. The feature extraction module includes an audio feature extraction model, an image feature extraction model, and a document feature extraction model. The feature refinement module includes an audio feature refinement model, an image feature refinement model, and a document feature refinement model. The following steps are separately performed on a current target type clip to obtain a first label of the current target type clip. The current target type clip is any target type clip in a plurality of target type clips.

(1) First, the feature extraction module separates audio, an image, and a video optical character recognition (OCR) subtitle document from the current target type clip, and then the feature extraction module performs feature extraction on the audio, the video image, and the OCR subtitle document to obtain a series of bottom-layer features. For example, image features extracted from the video image include a color feature, a texture feature, a shape feature, a spatial relationship feature, and the like of the image, and audio features extracted from the audio include a tone feature, an important pause, and the like. Then, the extracted bottom-layer features are respectively input into corresponding feature refinement models to obtain higher-level features.

Further, as shown in FIG. 12, audio extracted from the current target type clip is first input into an audio feature extraction model, to obtain a plurality of first audio feature vectors. The audio feature extraction model may be a VGGish network model. The VGGish is a model obtained through pre-training a large quantity of YouTube datasets. The VGGish is a model of a VGG neural network style, and supports extraction of a 128-dimensional feature vector having semantics from an audio waveform. In other words, the extracted first audio feature vector herein is 128-dimensional by default. Certainly, the VGGish model may be adjusted, to change a dimension of the output first audio feature vector. The plurality of extracted first audio feature vectors are input into an audio feature refinement model, to obtain a second audio feature vector. The audio feature refinement model may be a first NetVLAD model. In the model, the plurality of first audio feature vectors are processed by using a NetVLAD algorithm, to obtain a higher-level feature, which is referred to as the second audio feature vector that may be set to be 128-dimensional. The NetVLAD algorithm is developed from a vector of locally aggregated descriptors (VLAD) algorithm. The NetVLAD algorithm is introduced in the following descriptions. It may be understood that, the first audio feature vector is processed by using the NetVLAD algorithm, and the obtained second audio feature vector is more distinguished relative to the first audio feature vector.

As shown in FIG. 12, an image (including a plurality of image frames) extracted from the current target type clip is first input into the image feature extraction model to obtain a plurality of first image feature vectors, and each image frame has one corresponding first image feature vector. The image feature extraction model may be an Inception-V3 network model. The Inception-V3 network model is a feed-forward neural network model that includes convolution or related calculation and has a deep structure and that is launched by Google, and is a representative algorithm for performing image feature extraction based on deep learning. The Inception-V3 network model supports extraction of a 1024-dimensional first image feature vector from an image. Certainly, the first image feature vector may alternatively be set to another dimension. The plurality of extracted first image feature vectors are input into the image feature refinement model, to obtain a second image feature vector. The image feature refinement model may be a second NetVLAD model. In the model, the plurality of first image feature vectors are also processed by using the NetVLAD algorithm, to obtain a higher-level feature, which is referred to as the second image feature vector that may be set to be 1024-dimensional herein.

As shown in FIG. 12, first, an OCR technology is used to extract a subtitle document from the current target type clip, to obtain the OCR subtitle document. The OCR technology can automatically identify text content that appears in a video, including a subtitle, a bullet screen, some texts of a natural scene, a vertical text, WordArt, and the like. In this embodiment of this disclosure, the subtitle document is mainly extracted. Then, the extracted OCR subtitle document is input into the document feature extraction model to obtain a first document feature vector. The document feature extraction model may use a word embedding algorithm, for example, a term frequency-inverse document frequency (TF-IDF) algorithm. A plurality of extracted first document feature vectors are input into the document feature refinement model, to obtain a second document feature vector. The document feature refinement model may be a third NetVLAD model. In the model, the plurality of first document feature vectors are processed by using the NetVLAD algorithm, to obtain a higher-level feature, which is referred to as the second document feature vector that may be set to be 256-dimensional herein.

It can be learned from the foregoing content that all the first NetVLAD model, the second NetVLAD model, and the third NetVLAD model use the NetVLAD algorithm, but parameters of the NetVLAD algorithm used in the models are different, and the parameters need to be learned from a corresponding sample set. The following briefly describes a process of using the NetVLAD algorithm in this embodiment of this disclosure by using image (it is assumed that N image frames are included) processing as an example.

The N image frames extracted from the current target type clip are separately input into an Inception-V3 model, to obtain N D-dimensional first image feature vectors $x_i$, $i \in [1, N]$, and $x_i$ is a first image feature vector corresponding to an $i^{th}$ image frame. Then, the N D-dimensional first image feature vectors are converted into K D-dimensional feature vectors $V_k$ by using Formula (2).

$$V_k(j) = \Sigma_{i=1}^{N} \frac{e^{w_k^T x_i + b_k}}{\Sigma_{k'} e^{w_{k'}^T x_i + b_{k'}}} (x_i(j) - c_k(j)) \qquad (2)$$

K is a quantity of clustering centers (K is adjustable), the clustering center is represented by $c_k$, $j \in [1, D]$, $k \in [1, K]$, $x_i(j)$ represents a $j^{th}$ feature value of the first image feature vector corresponding to the $i^{th}$ image frame, and $c_k(j)$ represents a $j^{th}$ feature value of a $k^{th}$ clustering center. $w_k$, $b_k$ and $c_k$ herein are parameters that need to be obtained through learning in the NetVLAD algorithm.

Finally, obtained K D-dimensional feature vectors $V_k$ are averaged, to obtain a D-dimensional feature vector, that is, the second image feature vector. Operations on the audio and the OCR subtitle document of the current target type clip are similar, and the second audio feature vector and the second document feature vector are obtained separately.

(2) As shown in FIG. 12, the second audio feature vector, the second image feature vector, and the second document feature vector of the current target type clip are input into the feature fusion module to perform feature fusion, to obtain a fused feature vector of the current target type clip. Further, vector splicing may be directly performed on the foregoing three feature vectors to obtain one fused feature vector. For example, the extracted second audio feature vector is 128-dimensional, the extracted second image feature vector is 1024-dimensional, and the extracted second document feature vector is 256-dimensional. Feature vectors of the foregoing three dimensions are directly spliced to obtain a 1408-dimensional (that is, 128+1025+256) fused feature vector. It should be noted that dimensions of various feature vectors mentioned above are adjustable. This embodiment of this disclosure provides only some reference values, and does not limit the dimensions.

(3) As shown in FIG. 12, the fused feature vector of the current target type clip is input into the classification model, to obtain a probability that the current target type clip belongs to each preset category, and then the current target type clip is classified into a preset category with a highest probability, to obtain the first label of the current target type clip. A name of the preset category and a quantity of preset categories may be set based on an actual application scene. This is not limited in this disclosure. For example, four preset categories: fighting, shooting, quarreling, and kissing may be set.

Figure 13:
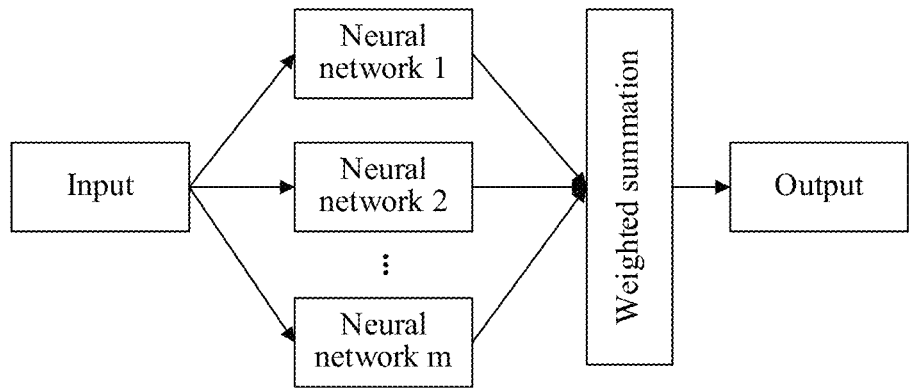
FIG. 13 is a schematic diagram of a structure of a mixture of experts model according to an embodiment of this disclosure.

Further, the classification model may be a mixture of experts (MOE) model. The MOE model is an integration method based on a plurality of modules. As shown in FIG. 13, a plurality of neural networks (that is, a plurality of experts) need to be trained for the model. Different neural networks have different structures, parameters, and the like, and therefore have different focuses. For a same input, predictions (that is, probabilities of belonging to each preset category) provided by different neural networks may be different. Each neural network provides a prediction, and then performs weighted summation calculation based on weights of different neural networks, to output a final prediction. It should be noted that a structure of the plurality of neural networks in the MOE model is not limited in this embodiment of this disclosure. The plurality of neural networks may be a fully connected neural network, a convolutional neural network, or the like. Parameters and weights of the neural networks need to be obtained through training.

After the first label of the current target type clip is obtained through the foregoing steps, a keyword/key phrase of the current target type clip needs to be obtained, for example, a person name or a place name, and then the keyword of the current target type clip and the first label are combined to obtain a second label of the current target type clip. In a possible embodiment, the keyword may be extracted from the OCR subtitle document. For example, a target type clip is processed by a multi-modal video analytics system, to obtain that the target type clip belongs to a "fighting" category, that is, the first label is "fighting". Then, two keywords "Shaolin Temple" and "Sweeping Monk" are extracted from an OCR subtitle document of the target type clip, and then the keywords are combined with the first label, to obtain a second label "Shaolin Temple+Sweeping Monk+Fight". It may be understood that a video resource stored in a video cloud platform 200 has some matched metadata information. For example, an episode of a drama has some matched introductions, which describe key information (for example, tasks and locations that appear and general story plots) in the video. Therefore, some keywords may also be extracted from metadata information of an original video corresponding to the current target type clip, and combined with the first label of the current target type clip to obtain the second label. A manner of extracting a keyword, a manner of combining labels, and the like are not limited in this disclosure.

After the second label of each target type clip is obtained by using the foregoing method, highlight video clips having the same second label (indicating a same plot) are included in a same set. The set is a video set on which split-screen and simultaneous-display playback can be implemented and that corresponds to a plurality of videos. A start time and a stop time that are of each video clip in the set and that are in the original video are recorded, and the content is stored as video information. It may be understood that the plurality of videos may have a plurality of video sets on which split-screen and simultaneous-display playback can be implemented, and each video set on which split-screen and simultaneous-display playback can be implemented includes a plurality of video clips having the same plot.

Actually, before the foregoing multi-modal video analytics system is used to obtain the second label of the target type clip, the system further needs to be trained. First, the plurality of target type clips is obtained, and categories to which the target type clips belong are manually labeled, to obtain the sample set. The sample set is used to train an original multi-modal analytics system, and the parameters of the three models in the feature refinement module and the classification model are updated, to obtain the multi-modal analytics system used in this embodiment of this disclosure.

In a possible embodiment, identifying the target type clip, labeling the start time and the stop time of each video clip, obtaining the first label or the second label of the target type clip, extracting the keyword, and constructing the video set on which split-screen and simultaneous-display playback can be implemented may all be completed by using manual operations. That is, the video clips having the same plot in the plurality of videos, and the start time and the stop time may be directly and manually labeled as the video set on which split-screen and simultaneous-display playback can be implemented.

S202: Send, to a terminal device 900, a video corresponding to another video clip having the same plot as a first video clip, and a start location and an end location of the other video clip, to enable the terminal device 900 to play the other video clip and the first video clip on a same interface.

In a possible embodiment, the video cloud platform 200 sends, to the terminal device 900, a part or all of the other video clip having the same plot as the first video clip. In other words, the video cloud platform 200 may send only a part of videos corresponding to another video clip and corresponding information, and a quantity of sent videos may be determined based on a setting of a user or a setting of the video cloud platform 200. In a possible embodiment, the video cloud platform 200 may send only the part or all of the video clips, and does not need to send a complete video.

It may be understood that, as shown in FIG. 2, the video cloud platform 200 may include a video media asset center 201 and a video content understanding module 202, and all the embodiment methods in S201 to S202 may be separately or jointly performed by the two.

It can be learned that, in this embodiment of this disclosure, the plurality of video clips having the same plot from the plurality of videos are pre-identified and associated, and a start time and a stop time of each video clip is separately recorded. When sending a watching request of a first video to the video cloud platform 200, the terminal device 900 sends a start time and a stop time of the first video clip in the first video to the terminal device 900 in addition sending the first video, so that the terminal device 900 prompts, when the first video clip is played, the user whether to watch the other video clip having the same plot as the first video clip. This caters to an association psychology of the user for a same plot clip. The video cloud platform 200, when receiving a same plot clip request of the first video clip from the terminal device 900, sends the video corresponding to the other video clip having the same plot as the first video clip and the start time and the stop time of the other video clip, so that the terminal device 900 plays the part or all of the other video clip and the first video clip on a same interface (at the same time), that is, implements split-screen and simultaneous-display playback of the plurality of video clips having the same plot. This provides intuitive comparison, and improves user experience.

Figure 14:
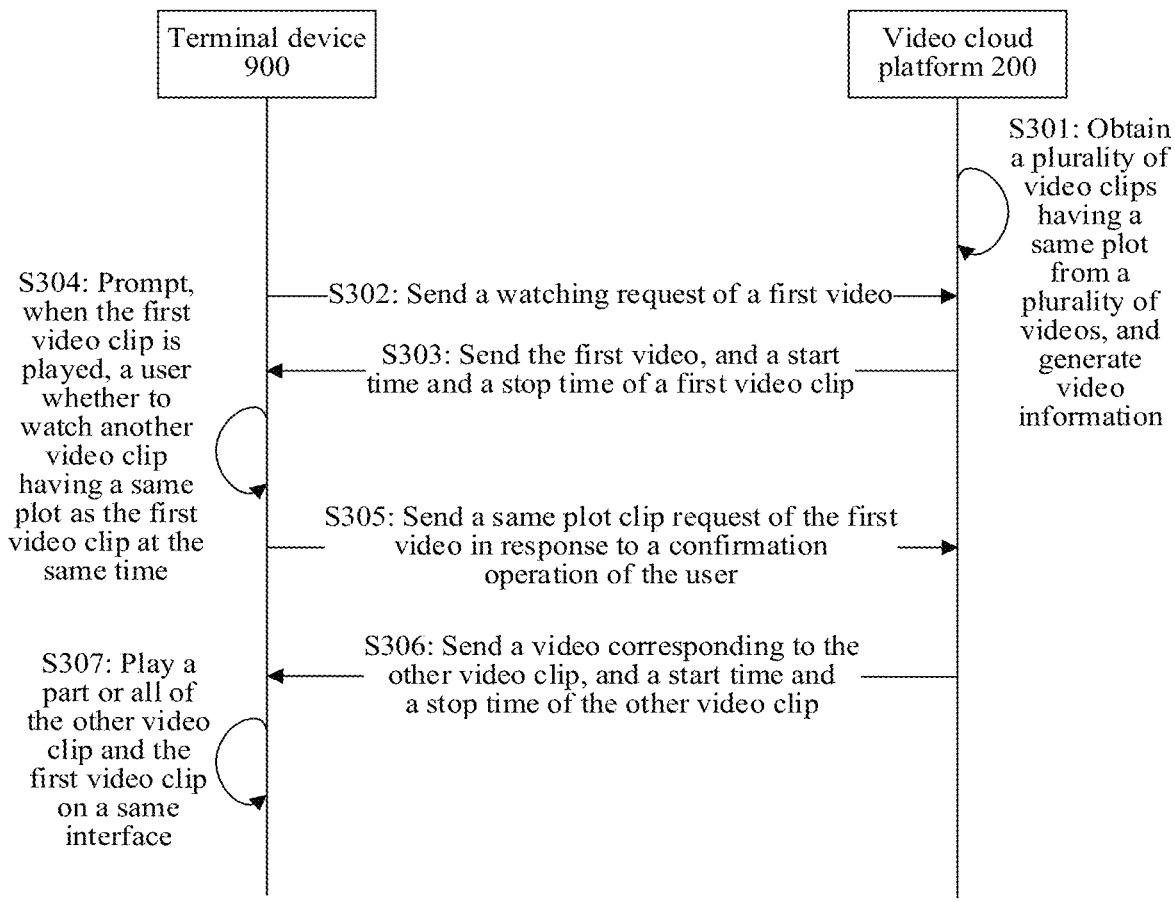
FIG. 14 is a schematic diagram of still another video playback method according to an embodiment of this disclosure.

FIG. 14 is a schematic flowchart of still another video playback method according to an embodiment of this disclosure. The method is applied to a video playback system. The video playback system includes a terminal device 900 and a video cloud platform 200. The method includes the following steps.

S301: The video cloud platform 200 obtains the plurality of video clips having the same plot from the plurality of videos, and generates video information.

The plurality of videos are related version videos, and the plurality of videos are in a one-to-one correspondence with the plurality of video clips having the same plot. The video information includes a start time and a stop time of each video clip in the plurality of video clips having the same plot. The first video is any video in the plurality of videos, and the plurality of video clips having the same plot includes the first video clip and the other video clip. For how the video cloud platform 200 obtains the plurality of video clips having the same plot in the plurality of videos, this step is the same as S202. Refer to the foregoing description.

S302: The terminal device 900 sends a watching request of the first video to the video cloud platform 200.

S303: The video cloud platform 200 sends the first video and a start time and a stop time of the first video clip to the terminal device 900.

The start time and the stop time include a start location and an end location of the first video clip in the first video.

S304: The terminal device 900 plays the first video, and prompts, when the start location of the first video clip is played, the user whether to also play the other video clip having the same plot as the first video clip.

A user prompting manner by the terminal device 900 is the same as the prompting manner in FIG. 7A and FIG. 7B. For details, refer to the foregoing description.

S305: The terminal device 900 sends a same plot clip request of the first video to the video cloud platform 200 in response to a confirmation operation of the user.

For the confirmation operation of the user, refer to the related description in S101.

S306: The video cloud platform 200 sends, to the terminal device 900, a video corresponding to the other video clip, and a start time and a stop time of the other video clip.

The foregoing another video clip have the same plot as the first video clip, and is derived from a related version of the first video.

S307: The terminal device 900 plays a part or all of the other video clip and the first video clip on a same interface.

This step is the same as step S102. Details are not described herein again.

Figure 15:
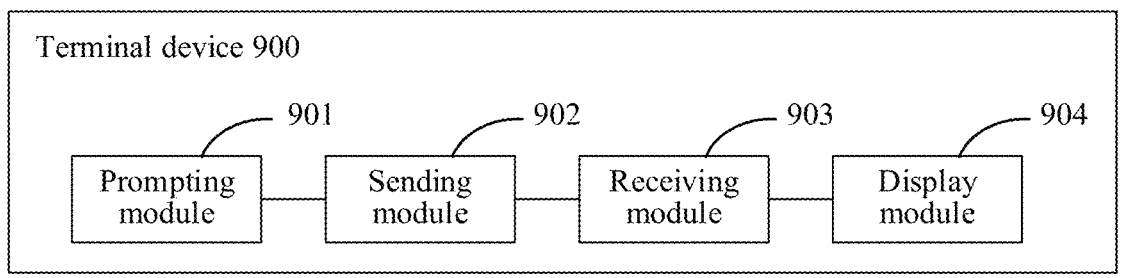
FIG. 15 is a schematic diagram of a structure of another terminal device according to an embodiment of this disclosure.

FIG. 15 is a schematic diagram of another terminal device 900 according to an embodiment of this disclosure. The terminal device 900 includes a prompting module 901, a sending module 902, a receiving module 903, and a display module 904.

The prompting module 901 is configured to detect a playback location of a first video, and prompt, when a start location of a first video clip in the first video is played, a user whether to watch another video clip having a same plot as a first video clip at the same time.

The sending module 902 is configured to send a same plot clip request of the first video clip to a video cloud platform.

The receiving module 903 is configured to receive, from the video cloud platform, a video corresponding to the other video clip, and a start location and an end location of the other video clip.

The display module 904 is configured to play a part or all of the other video clip and the first video clip on a same interface.

The modules of the terminal device 900 are further configured to implement the method in any embodiment of the video playback method in FIG. 5 or FIG. 14. For brevity of the specification, details are not described herein again.

Figure 16:
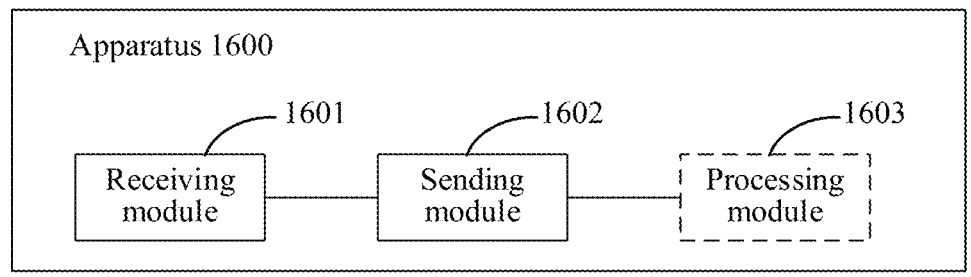
FIG. 16 is a schematic diagram of a structure of an apparatus according to an embodiment of this disclosure.

FIG. 16 is a schematic diagram of an apparatus 1600 according to an embodiment of this disclosure. The apparatus 1600 includes a receiving module 1601 and a sending module 1602.

The receiving module 1601 is configured to receive a same plot clip request of a first video clip from a terminal device. The first video clip is located in a first video.

The sending module 1602 is configured to send, to the terminal device, a video corresponding to another video clip having a same plot as the first video clip, and a start location and an end location of the other video clip, to enable the terminal device to play a part or all of the other video clip and the first video clip on a same interface.

In a possible embodiment, the apparatus 1600 further includes a processing module 1603. The processing module 1603 is configured to obtain a plurality of video clips having the same plot from a plurality of videos, and separately record a start location and an end location of each video clip in the plurality of video clips having the same plot. The first video is any video in the plurality of videos, and the plurality of video clips having the same plot include the first video clip and the other video clip.

The modules of the apparatus 1600 are further configured to implement functions of the video cloud platform 200 in the video playback method in FIG. 10 or FIG. 14. For brevity of the specification, details are not described herein again.

An embodiment of this disclosure further provides a video playback system. The video playback system includes the terminal device 900 and/or the apparatus 1600.

An embodiment of this disclosure further provides a computer-readable storage medium. The computer-readable storage medium stores instructions. When the instructions are run on a processor, the method procedures in FIG. 5, FIG. 10, and FIG. 14 are implemented.

An embodiment of this disclosure further provides a computer program product. When the computer program product runs on a processor, the method procedures, in FIG. 5, FIG. 10, and FIG. 14 are implemented.

A person of ordinary skill in the art may understand that all or a part of the procedures of the methods in embodiments may be implemented by a computer program instructing relevant hardware. The program may be stored in a computer-readable storage medium. When the program runs, the procedures of the method embodiments are included. The storage medium may include a magnetic disk, an optical disc, a read-only memory (ROM), a RAM, or the like.

What is disclosed above is merely an example embodiment of this disclosure, and certainly is not intended to limit the scope of the claims of this disclosure. A person of ordinary skill in the art may understand that all or a part of procedures that implement the foregoing embodiments and equivalent modifications made in accordance with the claims of this disclosure shall fall within the scope of this disclosure.

What is claimed is:

1. A method comprising:
    detecting a playback location of a first video comprising a first video clip;
    querying, when a first start location of the first video clip is played, a user whether to watch a second video clip having a same plot as the first video clip at the same time as the first video clip;
    obtaining a confirmation operation of the user;
    sending, in response to the confirmation operation, a same plot clip request of the first video clip to a video cloud platform;
    receiving, from the video cloud platform, a second video corresponding to the second video clip, a second start location of the second video clip, and a first end location of the second video clip; and
    playing a part or all of the second video clip and the first video clip on a same interface.

2. The method of claim 1, further comprising:
    querying, when playing of the first video clip and the second video clip is completed, the user whether to continue to watch the first video and the second video; and
    continuing to play, when the user selects to continue to watch the first video and the second video, the first video and the second video.

3. The method of claim 1, further comprising:
    querying, when playing of the first video clip or the second video clip is completed, the user whether to continue to watch the first video or the second video; and
    closing, when the user selects to watch only the first video, the second video.

4. The method of claim 1, further comprising:
    querying, when playing of the first video clip or the second video clip is completed, the user whether to continue to watch the first video or the second video; and
    closing, when the user selects to watch only the second video, the first video.

5. The method of claim 1, wherein before detecting the playback location, the method further comprises:
    sending, to the video cloud platform, a watching request of the first video;
    receiving, in response to the watching request and from the video cloud platform, the first video, the first start location, and a second end location of the first video clip; and
    playing the first video.

6. A method implemented by a video cloud platform, wherein the method comprises:
    receiving, from a terminal device, a same plot clip request of a first video clip located in a first video; and
    sending, to the terminal device, a second video corresponding to a second video clip having a same plot as the first video clip, a first start location of the second video clip, and a first end location of the second video clip.

7. The method of claim 6, wherein before receiving the same plot clip request, the method further comprises:
    receiving, from the terminal device, a watching request of the first video; and
    sending, in response to the watching request and to the terminal device, the first video, a second start location of the first video clip, and a second end location of the first video clip.

8. The method of claim 6, wherein before receiving the same plot clip request, the method further comprises:
    obtaining a plurality of video clips that have the same plot and are from a plurality of videos; and
    separately recording a second start location and a second end location of each of the video clips, wherein the first video is any one of the videos, and wherein the video clips comprise the first video clip and the second video clip.

9. The method of claim 8, wherein obtaining the video clips comprises:
    obtaining a plurality of target type clips from the videos; and
    obtaining the video clips from the target type clips.

10. The method of claim 9, wherein obtaining the target type clips comprises:
    separately performing shot splitting on each of the videos to obtain a shot set corresponding to each of the videos;
    separately performing shot clustering on the shot set using a cluster algorithm to obtain a video clip set corresponding to each of the videos; and
    separately inputting each of the video clips in the video clip set into a target type detection model to obtain the target type clips.

11. The method of claim 9, further comprising:
    extracting, from a current target type clip in the target type clips, an audio, an image, and a subtitle document;
    inputting the audio into an audio feature extraction model to obtain a first audio feature vector of the current target type clip;
    inputting the image into an image feature extraction model to obtain a first image feature vector of the current target type clip;
    inputting the subtitle document into a document feature extraction model to obtain a first document feature vector of the current target type clip;
    inputting the first audio feature vector into an audio feature refinement model to obtain a second audio feature vector of the current target type clip;
    inputting the first image feature vector into an image feature refinement model to obtain a second image feature vector of the current target type clip;
    inputting the first document feature vector into a document feature refinement model to obtain a second document feature vector of the current target type clip;
    performing vector splicing on the second audio feature vector, the second image feature vector, and the second document feature vector to obtain a fused feature vector of the current target type clip;
    inputting the fused feature vector into a classification model to obtain a first label of the current target type clip;
    extracting a keyword of the current target type clip;
    combining the keyword and the first label to obtain a second label of the current target type clip; and
    setting corresponding target type clips having the same second label as the third video clips.

12. The method of claim 11, wherein the audio feature extraction model is a VGGish network model, wherein the image feature extraction model is an Inception-V3 network model, wherein the classification model is a mixture of experts model, wherein the audio feature refinement model is a first NetVLAD model, wherein the image feature refinement model is a second NetVLAD model, wherein the document feature refinement model is a third NetVLAD model, and wherein model parameters of the first NetVLAD model, the second NetVLAD model, and the third NetVLAD model are different.

13. An electronic device comprising:
   at least one memory configured to store instructions; and
   at least one processor coupled to the at least one memory and configured to execute the instructions to cause the electronic device to:
      detect a playback location of a first video comprising a first video clip;
      query, when a first start location of the first video clip is played, a user whether to watch a second video clip having a same plot as the first video clip at the same time as the first video clip;
      obtain a confirmation operation of the user;
      send, in response to a confirmation operation of the user, a same plot clip request of the first video clip to a video cloud platform;
      receive, from the video cloud platform, a second video corresponding to the second video clip, a second start location of the second video clip, and a first end location of the second video clip; and
      play a part or all of the second video clip and the first video clip on a same interface.

14. The electronic device of claim 13, wherein the at least one processor is further configured to execute the instructions to cause the electronic device to:
   query, when playing of the first video clip and the second video clip is completed, the user whether to continue to watch the first video and the second video; and
   continue to play, when the user selects to continue to watch the first video and the second video, the first video and the second video.

15. The electronic device of claim 13, wherein the at least one processor is further configured to execute the instructions to cause the electronic device to:
   query, when playing of the first video clip and the second video clip is completed, the user whether to continue to watch the first video and the second video; and
   close, when the user selects to watch only the first video, the second video.

16. The electronic device of claim 13, wherein the at least one processor is further configured to execute the instructions to cause the electronic device to:
   query, when playing of the first video clip and the second video clip is completed, the user whether to continue to watch the first video and the second video; and
   close, when the user selects to watch only the second video, the first video.

17. The electronic device of claim 13, wherein before detecting the playback location, the at least one processor is further configured to execute the instructions to cause the electronic device to:
   send, to the video cloud platform, a watching request of the first video;
   receive, in response to the watching request and from the video cloud platform, the first video, the first start location, and a second end location of the first video clip; and
   play the first video.

18. The electronic device of claim 13, wherein the at least one processor is further configured to execute the instructions to cause the electronic device to:
   query, when the first start location is played, the user whether to watch the second video clip at the same time in a form of a bullet screen; and
   continue to play the first video when a tapping operation of the user is not detected within a display time of the bullet screen.

19. The electronic device of claim 13, wherein the at least one processor is further configured to execute the instructions to cause the electronic device to:
   query, when the first start location is played, the user whether to watch the second video clip at the same time in a form of a dialog box; and
   continue to play the first video when a tapping operation of the user is not detected within a display time of the dialog box.

20. The electronic device of claim 13, wherein the at least one processor is further configured to execute the instructions to cause the electronic device to:
   query, when the first start location is played, the user whether to watch the second video clip at the same time in a form of a voice prompt;
   receive, from the user, a voice signal; and
   determine, based on the voice signal, to play the first video.

* * * * *

UNITED STATES PATENT AND TRADEMARK OFFICE
CERTIFICATE OF CORRECTION

Page 1 of 1

PATENT NO. : 12,267,560 B2
APPLICATION NO. : 18/468307
DATED : April 1, 2025
INVENTOR(S) : Wei Xu and Lei Jiang It is certified that error appears in the above-identified patent and that said Letters Patent is hereby corrected as shown below:

On the Title Page

(71) Applicants: "Petal Cloud Technology Co., Ltd., Guangdong (CN)" should read "Petal Cloud Technology Co., Ltd., Dongguan City (CN)"

Signed and Sealed this
Twenty-third Day of September, 2025

John A. Squires
*Director of the United States Patent and Trademark Office*